(12) United States Patent
Thøgersen

(10) Patent No.: US 10,077,120 B2
(45) Date of Patent: Sep. 18, 2018

(54) SYSTEM FOR HANDLING OF LUGGAGE OR PARCEL ITEMS

(71) Applicant: BBHS A/S, Hedehusene (DK)

(72) Inventor: Lars Thøgersen, Copenhagen S (DK)

(73) Assignee: BBHS A/S, Hedehusene (DK)

( * ) Notice: Subject to any disclaimer, the term of this patent is extended or adjusted under 35 U.S.C. 154(b) by 0 days.

(21) Appl. No.: 15/540,142

(22) PCT Filed: Dec. 28, 2015

(86) PCT No.: PCT/EP2015/081285
§ 371 (c)(1),
(2) Date: Jun. 27, 2017

(87) PCT Pub. No.: WO2016/107844
PCT Pub. Date: Jul. 7, 2016

(65) Prior Publication Data
US 2018/0009550 A1    Jan. 11, 2018

(30) Foreign Application Priority Data

Dec. 29, 2014 (EP) .................................... 14200440
Jan. 30, 2015 (EP) .................................... 15153193

(51) Int. Cl.
| B65G 65/02 | (2006.01) |
| B65G 67/08 | (2006.01) |
| B64F 1/36 | (2017.01) |

(52) U.S. Cl.
CPC .............. *B64F 1/368* (2013.01); *B65G 65/02* (2013.01); *B65G 67/08* (2013.01); *B65G 2201/0264* (2013.01); *B65G 2201/0285* (2013.01)

(58) Field of Classification Search
CPC .......... B65G 65/02; B65G 67/08; B64F 1/368
(Continued)

(56) References Cited

U.S. PATENT DOCUMENTS 3,260,349 A * 7/1966 Vander Meer ........ B61L 23/005
104/88.06
3,561,623 A * 2/1971 McCaul .................... B64F 1/32
198/350

(Continued)

FOREIGN PATENT DOCUMENTS

AU    2013100976 A4    8/2013
DE    102013204810 A1    9/2014
(Continued)

OTHER PUBLICATIONS

European Search Report From EP Application No. 14200440, dated Jul. 16, 2015.
(Continued)

*Primary Examiner* — Douglas A Hess
(74) *Attorney, Agent, or Firm* — Workman Nydegger

(57) ABSTRACT

A system for handling of luggage or parcel items comprises at least one cart with shelves, at least one item conveyor, such as a sorting conveyor or a luggage reclaim conveyor, and at least one item accumulation unit arranged in proximity to the conveyor. The item accumulation unit is configured as a buffer for storing a plurality of the items on a plurality of accumulation shelves. An item transfer structure is configured to transfer the plurality of the items from the sorting conveyor or from the shelves of the at least one cart into the item accumulation unit. Operation of item accumulation unit and/or the item transfer structure is controlled by a control system.

20 Claims, 31 Drawing Sheets

(58) Field of Classification Search
USPC .............. 414/331.06, 331.08, 331.09, 331.1, 414/331.15, 679; 244/137.1; 198/347.2
See application file for complete search history.

(56) References Cited

U.S. PATENT DOCUMENTS

| | | | | |
|---|---|---|---|---|
| 3,610,159 | A * | 10/1971 | Fickenscher | B64F 1/368 104/88.05 |
| 3,695,462 | A * | 10/1972 | Sullivan | B64F 1/366 198/350 |
| 3,776,395 | A * | 12/1973 | Lingg | B64F 1/368 198/465.2 |
| 4,137,597 | A * | 2/1979 | Achenbach | G03G 15/2025 15/256.51 |
| 4,416,435 | A * | 11/1983 | Szendrodi | B64F 1/368 244/114 R |
| 5,222,855 | A * | 6/1993 | Bernard, II | B65G 1/0485 198/340 |
| 5,225,990 | A * | 7/1993 | Bunce | B65G 47/50 700/226 |
| 5,325,972 | A * | 7/1994 | Prydtz | B07C 5/361 198/349 |
| 5,588,790 | A * | 12/1996 | Lichti | B65G 1/133 198/333 |
| 5,842,555 | A * | 12/1998 | Gannon | B64F 1/368 198/349.5 |
| 6,164,892 | A * | 12/2000 | Malloy | B64F 1/32 198/370.1 |
| 7,343,995 | B2 * | 3/2008 | Fukuhara | B64F 1/00 180/167 |
| 7,353,955 | B2 * | 4/2008 | Edwards | B65G 47/5104 198/348 |
| 7,575,112 | B2 * | 8/2009 | Lowes | B64F 1/368 198/349 |
| 8,444,369 | B2 * | 5/2013 | Watt | B65G 49/00 414/809 |
| 8,596,947 | B1 | 12/2013 | Stenzel | |
| 9,317,034 | B2 * | 4/2016 | Hoffman | G05D 1/0027 |
| 9,334,115 | B2 * | 5/2016 | Bartelet | B65G 1/10 |
| 9,676,561 | B1 * | 6/2017 | Snook | B65G 47/51 |
| 2001/0032034 | A1 * | 10/2001 | Manabe et al. | |
| 2004/0050659 | A1 | 3/2004 | Jensen et al. | |
| 2005/0192701 | A1 * | 9/2005 | Ben-Ezra | |
| 2011/0002761 | A1 * | 1/2011 | Aimable-Lima et al. | |
| 2017/0200248 | A1 * | 7/2017 | Murphy | |

FOREIGN PATENT DOCUMENTS

| | | |
|---|---|---|
| FR | 2870209 A1 | 11/2005 |
| GB | 1384593 A | 2/1975 |
| GB | 2320236 A | 6/1998 |
| NL | 1033273 C2 | 7/2008 |
| WO | 2008020084 A1 | 2/2008 |
| WO | 2013180563 A2 | 12/2013 |

OTHER PUBLICATIONS

International Preliminary Report on Patentability From PCT Application No. PCT/EP2015/081285, dated May 18, 2017.
International Search Report From PCT Application No. PCT/EP2015/081285, dated Mar. 15, 2016.

* cited by examiner

SYSTEM FOR HANDLING OF LUGGAGE OR PARCEL ITEMS

TECHNICAL FIELD

The present invention relates to a system for handling of luggage or parcel items, for example at airports or parcel sorting and distribution facilities. The invention is particularly concerned with an interface between a cart for transport of items and a sorter or conveyor site.

BACKGROUND OF THE INVENTION

Various systems are known for transporting, sorting and storing various items and goods, including luggage and parcel items. Such systems are usually tailored to meet specific requirements set by the nature, size and weight of the items, as well as requirements regarding sorting, transport distances and speed of transportation.

One specific field of interest of the present application is the field of transportation and storage of luggage or parcel items in airports. In most airports, checked-in luggage is usually conveyed from a plurality of check-in counters to a central luggage conveying and/or sorting apparatus, at which each luggage item is sorted according to its destination. Such conveying and/or sorting apparatus normally comprises a plurality of discharge units, in each of which luggage items destined for a particular aircraft are accumulated. The luggage items are then manually loaded onto carts or trolleys piece by piece, by means of which the items are transported to the aircraft. The carts or trolleys may be self-propelled, or they may be attachable to a propelling unit (or tractor), which may be arranged to pull a plurality of trolleys or carts coupled together to form a train. Likewise parcels being sorted are typically discharged from a sorting conveyor into a plurality of manned collecting stations, each of which is designated for a particular destination. From the collecting stations, the parcels are transported in containers, cages or bins to an aircraft.

Arriving luggage and arriving parcels at airports are typically conveyed from an aircraft site in similar carts, containers, cages or bins to a conveyor, that are unloaded manually to delivery belts which conveys the items onto a sorting conveyor, if the items are in transit, or to a luggage reclaim belt or a parcel distribution facility if the items have arrived at their final destination airport.

International patent publication No. WO 2008/020084 discloses a cart for transport and storage of items comprising a plurality of inclined shelves arranged in rows and columns. The cart can be coupled to an identical cart, and multiple coupled carts may thus form a train. Though the cart disclosed in WO 2008/020084 greatly improves luggage handling between airplane sites and airport conveyors, a need for further facilitating of luggage and parcel handling at airports, sorting facilities and similar locations has arisen.

Moreover, some airports, airport operators and airlines may for various reasons have decided not to implement the cart of WO 2008/020084, and under such circumstances an even greater need exists for expediting handling of luggage and parcels.

SUMMARY OF THE INVENTION

On the above background it is an object of embodiments of the invention to provide a system, which expedites handling of luggage and parcels at airports, sorting facilities and similar facilities, notably in the sense of providing a system which reduces the need for manual labour work. It is a further object of embodiments of the invention to provide a system which improves operator convenience in relation to, e.g., early luggage, reduces the time during which the items are underway between a sorter or conveyor and an aircraft site or vice versa. It is a still further object of embodiments of the invention to provide a system, installation and operation of which is easy, and which can be integrated with a variety of different sorting system. It is a still further object of embodiments of the invention to provide a system, which enhances capacity utilization per square meter of the conveyor and sorting systems, as well as of the building premises housing such conveyor and sorting systems. It is a still further object of embodiments of the invention to provide a system, which enhances sorter output capacity and enables segmentation of items, such as pieces of luggage or parcels, notably with a view to enabling individual handling of different groups of items.

In a first aspect, the invention hence provides a system for handling of luggage or parcel items, comprising:
- at least one cart comprising a plurality of cart shelves, each of which is sized to accommodate a plurality of said items;
- at least one item conveyor selected among:
  - a sorting or transfer conveyor for conveying the items from a sorting or transfer conveyor loading position to at least one unloading position; and
  - a delivery conveyor for conveying the items from a delivery conveyor loading position to a luggage reclaim area, or to the sorting or transfer conveyor, or to a parcel distribution facility, or to a further conveyor;

characterised by:
- at least one item accumulation unit arranged in proximity to at least one of:
  - said at least one unloading position of the sorting or transfer conveyor and
  - the delivery conveyor loading position, said item accumulation unit being configured to store a plurality of the items on a plurality of accumulation shelves;
- an item transfer structure configured to transfer said plurality of the items from the sorting or transfer conveyor or from the shelves of the at least one cart into the item accumulation unit;
- an electronic control system for controlling operation of at least one of the item accumulation unit and the item transfer structure.

The at least one unloading position may comprise a plurality of unloading positions along the sorting or transfer conveyor. The sorting or transfer conveyor may hence be configured for conveying the items from the sorting or transfer conveyor loading position to respective ones of the unloading positions along the sorting or transfer conveyor. The at least one item accumulation unit may in such embodiments be arranged in proximity to at least one of:
- the unloading positions of the sorting or transfer conveyor and
- the delivery conveyor loading position.

In one embodiment of the invention, the sorting or transfer conveyor may comprise a closed-loop conveyor.

The accumulation unit provides a means—or a buffer—forming an interface between the cart and the items conveyor. For departing items, such as departing luggage or parcels at an airport or parcel distribution facility, the item conveyor usually comprises the sorting or transfer conveyor, whereas for arriving items, such as arriving luggage at an airport or arriving parcels, the item conveyor comprises the delivery conveyor. In one embodiment of the accumulation unit, it intermittently stores, i.e. buffers, a plurality of departing items, and in another embodiment it buffers a plurality of arriving items. Accumulation units according to both embodiments may be included in the system according to the invention. Departing items unloaded from the sorting or transfer conveyor are allowed to be accumulated by the accumulation unit before they are transported away to, e.g., an aircraft site by the cart. Arriving items unloaded from the cart are allowed to be accumulated by the accumulation unit before they are loaded onto the delivery conveyor. The accumulation unit hence provides an item buffer between the sorting or transfer conveyor and the cart, and/or between the cart and the delivery conveyor, respectively. By the provision of the accumulation unit at the delivery conveyor loading position, carts may be swiftly emptied, even when there is no available space at the delivery conveyor for the items, whereby the emptied carts can be made available for other purposes without delay. Similarly, by provision of the accumulation unit at the unloading positions of the sorting or transfer conveyor, items may conveniently be collected and optionally aligned at the accumulation unit, in which case the accumulation unit may preferably be configured to load the items directly onto the cart whenever the cart is parked at the accumulation unit in a state ready to accept items.

The sorting or transfer conveyor may include a so-called line conveyor, such as a conveyor having a single loading position at a loading end and a single unloading position at an unloading end. This may be advantageous if the sorting or transfer conveyor primarily serves so as to transport items from the loading position to the unloading position.

The system of the invention may comprise a single departure accumulation unit or a plurality of departure accumulation units, such as at least five or at least ten departure accumulation units. A single arrival accumulation unit or a plurality thereof may be provided. In one embodiment of the invention, the system comprises more departure accumulation units than arrival accumulation units.

In the present invention, transfer of items to and from the cart shelves, and to and from the accumulation shelves of the accumulation units may occur in an automated manner without manual labour intervention. The item transfer structure may include transfer means at any one of the at least one cart, the accumulation unit(s), and the item conveyor. As regards the at least one cart, the item transfer structure may include an inclination of the shelves so as to cause items to slide from a loading end of the cart towards an unloading end thereof under the action of gravity. Alternatively, or additionally, belts or other item transferring means may be provided on-board each cart for moving items along each shelf of the cart. As regards the accumulation units, the item transfer structure may include inclined sliding surfaces for causing items to move under the action of gravity from a loading end of the accumulation unit, and/or belt structures and/or other item transferring means. At the item conveyor, pushers, belts, tiltable trays, or any other suitable means may be provided to constitute the item transfer structure or part thereof.

In embodiments of the invention, in which the cart comprises a plurality of shelves arranged in rows and columns, the accumulation unit and its accumulation shelves may be configured with an equal number of rows and columns arranged at approximately identical distances as the distances between the shelves of the cart, so that each shelf of the accumulation unit may be mated with a shelf of the cart, be it for arriving or departing luggage. Thus, generally the accumulation shelves of the item accumulation unit may be configured to form a structure of first columns and/or rows, and the cart shelves of the at least one cart may be configured to form a second structure of columns and/or rows, whereby each respective accumulation and cart shelf of one of the first and second structures essentially lies flush with the other one of the first and second structures when the at least one cart is in a predetermined parking position relative to the item accumulation unit.

For luggage applications, the sorting or transfer conveyor loading position may be provided at or connected to a luggage check-in area of an airport.

For departing items, the item conveyor comprises the sorting or transfer conveyor, in which cases the item accumulation unit preferably comprises at least one column of the plurality of accumulation shelves, which are hence arranged one above the other. A plurality of columns may be provided next to each other, so that the accumulation unit forms a matrix structure of shelves arranged in rows and columns. In such embodiments, the item transfer structure may preferably be configured to selectively discharge each one of the plurality of items from the sorting or transfer conveyor into a selected one of said accumulation shelves. The sorting or transfer conveyor and the item transfer structure may thus for example be configured to load priority items, such as priority luggage items, into a particular one of the shelves, and other items into another one. Items may be further categorized by the control system. For example, respective designated shelves may be provided in the accumulation unit for the following categories of items:

Non-priority items, which arrive at their final destination with the next flight.

Priority items, which arrive at their final destination with the next flight.

Non-priority items, which will be in transit at their next flight's destination airport.

Priority items, which will be in transit at their next flight's destination airport.

Short-connection items, which are to be rushed at the destination airport.

Further categories of items may be envisaged and implemented in embodiments of the control system of the present invention.

In general, the control system may be configured to assign, to each of the items, a particular accumulation shelf of the departure accumulation unit, before the items is being loaded into the departure accumulation unit from the sorting or transfer conveyor. Thus, the designated departure accumulation unit for each item may be predetermined—or defined by—the control system of the system, thus maximizing the utility of the available space at the departure accumulating unit(s) and balancing the desire for categorization and priority assigning to individual items to available space constraints.

Alternatively, the items may be loaded onto a plurality of shelves of the accumulation unit in a way that merely packs one shelf at a time with no categorization or priority scheme being applied, which is desirable in case of handling point to point luggage.

The control system may be configured to transfer control data along with the items. For example, in respect of departing items, data, such as item identifications, and destinations and/or origins, may be passed from the control system to the at least one cart and/or to control hardware at the aircraft site, such as a control system of an airport loading apparatus, or to the control hardware aboard the aircraft itself. Data may also be similarly transferred to and intermittently stored at control hardware of the at least one accumulation unit. The data may be wirelessly transmitted or transmitted by wired connections, and/or via separate terminal, such as handheld terminals. In another example, data may similarly be transferred to the control system along with arriving items. Thus, destination and/or origin data may be transferred from the at least one cart and/or from the aircraft site to control hardware of the at least one accumulation unit and/or to the control system.

For controlled offloading from the sorting or transfer conveyor onto the accumulation shelf or shelves of the accumulation unit, the item transfer structure may comprise a pusher for individually pushing each one of the items from the sorting or transfer conveyor into the item accumulation unit in a direction transverse to a direction of movement of the sorting or transfer conveyor. The operation of the pusher may be electronically controlled by an operating system of the sorting or transfer conveyor. The control system of the sorting or transfer conveyor may further be configured to select one of the accumulation shelves for each item and to control the item transfer structure to the selected accumulation shelf. Thus, each individual item may be reliably and gently transferred to the designated shelf, and gradually through the system The sorting or transfer conveyor, the pusher, the accumulation unit and/or a supporting structure of any one of the aforementioned elements may comprise height-displacement means operable by the control system for ensuring that the items are discharged into the selected designated shelf of the accumulation unit.

The item accumulation unit may itself comprise an item movement structure for automatically moving each one of the items accommodated by each one of the accumulation shelves from a loading end thereof towards an unloading end thereof. For example each shelf of the cart may be inclined with respect to horizontal, the shelf thereby defining an upper end and a lower end, the upper end of the shelf being arranged at a loading end of the cart, and the lower end being arranged at an unloading end of the cart. A releasable closure structure may be provided at the lower end of the shelf, the closure structure having a closing position, in which it retains items supported by the shelf in the cart, and an open, non-closing position, in which items may be removed from the cart at the lower end of the shelf. In one embodiment, the cart may be as claimed and disclosed in international patent publication No. WO 2008/020084, which is hereby incorporated by reference.

For processing of arriving items in transit, the delivery conveyor may connect to the sorting or transfer conveyor for transfer of the items from the delivery conveyor loading position onto the sorting or transfer conveyor, and for processing of arriving items, which are at their final destination, the delivery conveyor may connect to a luggage reclaim belt for transfer of the items from the delivery conveyor loading position onto the luggage reclaim belt. The loading position of the delivery conveyor may be the same in both instances, with the delivery conveyor branching into a connector conveyor for the sorting or transfer conveyor and a further connector conveyor for the luggage reclaim conveyor.

In order for the system to efficiently process both departing and arriving items, the at least one accumulation unit may comprise respective departure and arrival accumulation units. The departure and arrival accumulation units may be identical, or they may preferably be configured differently.

For departing items in particular, the at least one cart may sized and configured to accommodate a number of items comparable to the number of items accommodateable by the accumulation unit. It may hence be ensured that one cart or a predetermined number of a plurality of carts may in fact accommodate all of the items of the accumulation unit. Generally, the at least one cart may be sized and configured to accommodate a first number of the items, and the accumulation unit for departing items may be sized and configured to accommodate a second number of items, whereby the first and second numbers differ by at most 1000%, such as at most 10-800%, such as at most 20-500%, such as by at most 100%. In preferred embodiments of the invention, the number of shelves of the accumulation unit is identical to the number of shelves of the cart. Hence, as regards the departure accumulation unit in particular, the length of each shelf of the accumulation unit preferably differs relative to the length of each cart shelf by at most 1000%, such at most 10-800%, such as at most 20-500%, such as by at most 100%. In one embodiment of the departure accumulation unit, the length of each shelf of the accumulation unit is substantially equal to the length of each shelf of the cart, or differs therefrom by at most 20%, whereby the departure accumulation unit may accommodate the same number of items as the cart.

Configuration of the cart will be achieved through the modular build of the cart (see FIG. 22 below). Regional differences and local airport peak structure in traffic determines the size, shelf number and configuration of the cart and all consolidation units be it for arrival or departure are configured according to the cart. There can be differences that will be best covered by having one configuration for arrival baggage and another configuration for departure baggage.

When loading the exact same number of items from the departure accumulation unit onto the cart, a list of item identifies may at the same time be passed by a central server or an accumulation unit controller of the control system onto a portable device carried by an operator at the aircraft site. The operate at the aircraft site may hence verify the destination, origin, ownership or other data associated with each item immediately prior to loading thereof onto the aircraft.

As far as arriving items is concerned, the accumulation unit may preferably be configured to accommodate a number of items, which is greater than the number of items accommodated by each cart. Generally, the at least one cart may be sized and configured to accommodate a first number of the items, and the accumulation unit for arriving items may be sized and configured accommodate a second number of items, which is at least equal to two times the first number. The accumulation unit may thus efficiently serve as a buffer for arriving items. Alternatively, each accumulation unit may have a length which is at least equal two and at most 50% larger than, preferably at least 10% larger than, such as 10-30% larger than, such as approximately 20% larger than the length of the cart shelves. The excess length of each accumulation unit may advantageously be used to accommodate tolerances and sensor reactions. A dispatch sequence may be chosen in the system so that all shelves conveyors may move all first dispatched baggage from one cart to a next accumulation unit in a row of accumulation units, the next, i.e. receiving accumulation unit preferably has the same length as the previous, i.e. dispatch accumulation unit in the row. From the receiving accumulation unit, each belt thereof may empty its items in an operator-controlled sequence to, e.g., a connection belt connecting to either a reclaim belt or—for transfer baggage—to the sorting conveyor for sortation to a new destination.

With a view to facilitating movement of items into and out of the accumulation unit, each of the shelves of the item accumulation unit may comprise an accumulation conveyor belt. The items may thus be moved through the accumulation unit under the action of the accumulation conveyor belt. Operation of the accumulation conveyor belt is preferably controllable by the electronic control system, and may be synchronized with the operation of an item movement structure of the cart.

In respect of arriving items, the accumulation shelves of the item accumulation unit may be arranged in rows one above the other, whereby the accumulation unit may be configured to feed the items from a lower one of the rows directly onto the delivery conveyor in a predetermined sequence allowing the items to move as "pearls on a string". The accumulation unit may further comprise a discharge chute at an unloading end of upper ones of the shelves for dropping the items onto the delivery conveyor under the action of gravity. Alternatively, or additionally, the delivery conveyor may comprise a vertically displaceable or a variably inclinable conveyor belt section. The accumulation unit is preferably controllable to drive the belt of one shelf at a time only, or all at the same time.

In order to expedite processing of arriving luggage or parcels, the control system may be configured to assign, to each of the items, a particular branch of the delivery conveyor, before the items are being offloaded from the at least one cart.

The item accumulation unit may be a mobile unit, or it may be immobilized relative to the at least one item conveyor. In a presently preferred embodiment of the invention, the item accumulation unit is immobilized, so that it remains in a fixed position relative to the sorting or transfer conveyor or the delivery conveyor. In case of departure the dispatch consolidation unit may be configured to be sideways guided by rails or other means resulting in a moveable embodiment enabling the dispatch accumulation units to position correctly. Such movement may be electronically controlled by the employment of, e.g., sensors in order to deliver items to the carts along a straight line, i.e. a preferably guided "load road". The storage compartment of the carts may be turned to a perpendicular position to the driving direction with the elevated loading end of the cart facing the dispatch units. The traversing dispatch units will find the correct position equaling alignment with the cart shelves for sequentially dispatching items to the cart. Data including, e.g., positioning and individual items status data may be transferred from the dispatch unit to the cart shown in an operator interface.

Preferred embodiments of the invention comprise a plurality of accumulation units for departing items and a plurality of accumulation units for arriving items.

Disclosed herein is also a cart, which is able to conveniently handle odd-size and oversize items.

The cart for transport and storage of items may preferably comprise:

a chassis comprising a plurality of wheels;
a storage section comprising at least one shelf;
a drawer below the storage section, the drawer comprising a compartment which is inaccessible when the drawer is in a closed state, in which the drawer is overlapped by a bottom portion of the storage section, and wherein the compartment is accessible when the drawer is an open state, in which the drawer is extracted from and extends beyond the bottom portion of the storage section.

A method for transport and storage of items by means of the above cart comprises the steps of:

loading a first group of said items onto the at least one shelf of the storage section;

loading at least one further item into the compartment of the drawer when the drawer is in the open state, said at least one further item being sized and shaped so that it does not fit into the compartment when the drawer is in the closed state; and transporting the items by means of said cart while the drawer remains in the open state.

Odd-size and over-size items which do not fit onto the shelves of the cart, or which are otherwise not suited for accommodation by the shelves, may be placed in the drawer, when the compartment is accessible, i.e. in the open state of the drawer. In the closed state of the drawer, it is preferably overlapped, most preferably completely overlapped, by the bottom portion of the storage section of the cart, so that the drawer does not occupy space or provide an obstacle when it is not being used. Hence, the drawer provides a space and structure for accommodating items when need, and when no such space and structure is needed, the drawer is conveniently stowed away underneath the storage section.

Generally, the storage section and the at least one shelf thereof may be sized and configured to accommodate items having a dimension or volume not exceeding a first maximum dimension or a first maximum volume, and the compartment may be sized and configured to accommodate odd-size items having a dimension or volume exceeding the first maximum dimension or the first maximum volume.

As will have become apparent from the above description, the first group of items accommodated by the shelves of the cart may comprise air passenger luggage, and said at least one further item may comprise odd-size or oversized air passenger luggage. The cart of the present invention is in particular suited for transporting items, such as luggage items, from an aircraft to a luggage conveyor of an airport, or from a luggage sorting or transfer conveyor of the airport to the aircraft. Other fields of use are envisaged, such as for example uses for food items, such as dairy or bakery products, notably in the field of retail distribution of goods in warehouses, grocery stores or supermarkets.

In order to couple the cart to an identical one to form a train of carts, a connecting element may be provided at the cart, the connecting element having a free end, which is configured to connect to the other cart. The connecting element preferably extends from the chassis of the cart below the drawer in the direction of extraction of the drawer, with the free end of the connecting element extending beyond the drawer when the drawer is fully extracted. The connecting element may hence couple to the next cart even when the drawer is open to allow the cart to be driven in a train of carts with the drawer in the open state. In an alternative embodiment, a front end of the cart may comprise a front connector, and the rear end of the cart may comprise a rear connector for connecting to the front connector or an identical cart, whereby the front connector and the rear connector together have a length exceeding the length of the drawer when extracted.

In one embodiment of the invention, the bottom portion of the storage section of the cart comprises a planer bottom surface, which is inclined relative to horizontal, in which case the drawer preferably comprises correspondingly tapering side structures, so as to allow the drawer to be accommodated in a safe-spacing manner below the storage section.

The at least one shelf may preferably comprise a plurality of shelves arranged in rows and columns as a matrix. Each of the shelves may be inclined relative to horizontal, so as to thereby define an upper end and a lower end, the upper end of each shelf being arranged at a loading end of the cart, and the lower end of each shelf being arranged at an unloading end of the cart.

Disclosed herein is also a system comprising at least one cart and an accumulation assembly for loading items on to the cart or for accepting items offloaded from the at least one cart, the at least one cart comprising:

a chassis comprising a plurality of wheels;

a storage section comprising at a plurality of shelves arranged in rows and/or columns to form a first matrix pattern;

wherein the accumulation assembly comprises a plurality of shelves arranged in rows and/or columns forming a second matrix pattern, and wherein each one of the shelves the first and second matrix patterns lies approximately flush with one of the shelves of the other one of the first and second patterns when the at least one cart is in a predetermined parking position relative to the conveyor assembly. In the present the term 'approximately flush' should be understood to mean that each of the shelves of the first matrix pattern forms a continuation of a mating one of the shelves of the second matrix pattern or vice versa.

Thanks to the mating matrix structures of shelves of the cart and the conveyor assembly, items may be loaded onto the at least one cart and offloaded therefrom in an automated manner, preferably without manual labour intervention. For offloading of items from the shelves of the cart, items may be offloaded under the action of gravity when the shelves are inclined, or they may be offloaded by movement of belts or other conveyor means on-board the cart. For loading of items onto the cart, the aforementioned on-board conveyor means may be applied, and/or conveyor means, such as belts, of the conveyor assembly may bring about the required transfer of the items from the conveyor assembly onto the shelves of the cart.

The item accumulation unit may immobilized relative to the at least one item conveyor. This may ensure that an item accumulation may always be present at a loading and/or unloading position of the at least one item conveyor.

The at least one cart may, for example, include a cart as disclosed and claimed in international patent publication No. WO 2008/020084. That is, the at least one cart may comprise at least one shelf, which is inclined with respect to a plane defined by the surface supporting the wheels of the cart. Thereby the shelf defines an upper end and a lower end, the upper end of the shelf being arranged at a loading end of the cart, and the lower end being arranged at an unloading end of the cart.

The cart may also comprise a releasable closure structure at the lower end of the shelf, the closure structure having a closing position, in which it retains items supported by the shelf in the cart, and an open, non-closing position, in which items may be removed from the cart at the lower end of the shelf.

Thanks to the inclination of the shelf, items loaded at the loading end of the cart are automatically conveyed towards the unloading end of the cart under the action of gravity when the cart is placed on an essentially horizontal supporting surface. Hence, items may be transferred from the accumulation unit on the shelf by simple serial loading from the loading end of the cart.

The storage section may also be rotatable with respect to the chassis around an upright axis. It may thus be possible to compensate for inaccurate parking of the cart at a loading or at an unloading spot with respect to an accumulation unit. It may also be possible to park the cart while the storage section has one orientation with respect to the chassis and to load or unload items, while the storage section has another orientation with respect to the chassis. Thus, if manoeuvring space is limited at the parking spot, and parking is not possible with the storage section in its loading or unloading position, the cart may be parked with the storage section in a different position, provided that such a position allows parking at the desired spot. Once the cart is parked, the storage section may be rotated, with respect to the chassis, to its loading or unloading orientation with respect to an accumulation unit or with respect to a connecting conveyor—a so-called ramp connector—at the aircraft site. The storage section is preferably rotatable with respect to the chassis through an angle of at least 45 degrees, more preferably through an angle of at least 90 degrees or at least 180 degrees, such as indefinitely rotatable.

In another embodiment, the at least one cart includes a cart according to the first aspect of the present invention.

BRIEF DESCRIPTION OF THE DRAWINGS

Embodiments of the invention will now be further described with reference to the accompanying drawings, in which.

DETAILED DESCRIPTION OF THE DRAWINGS

Figure 1:
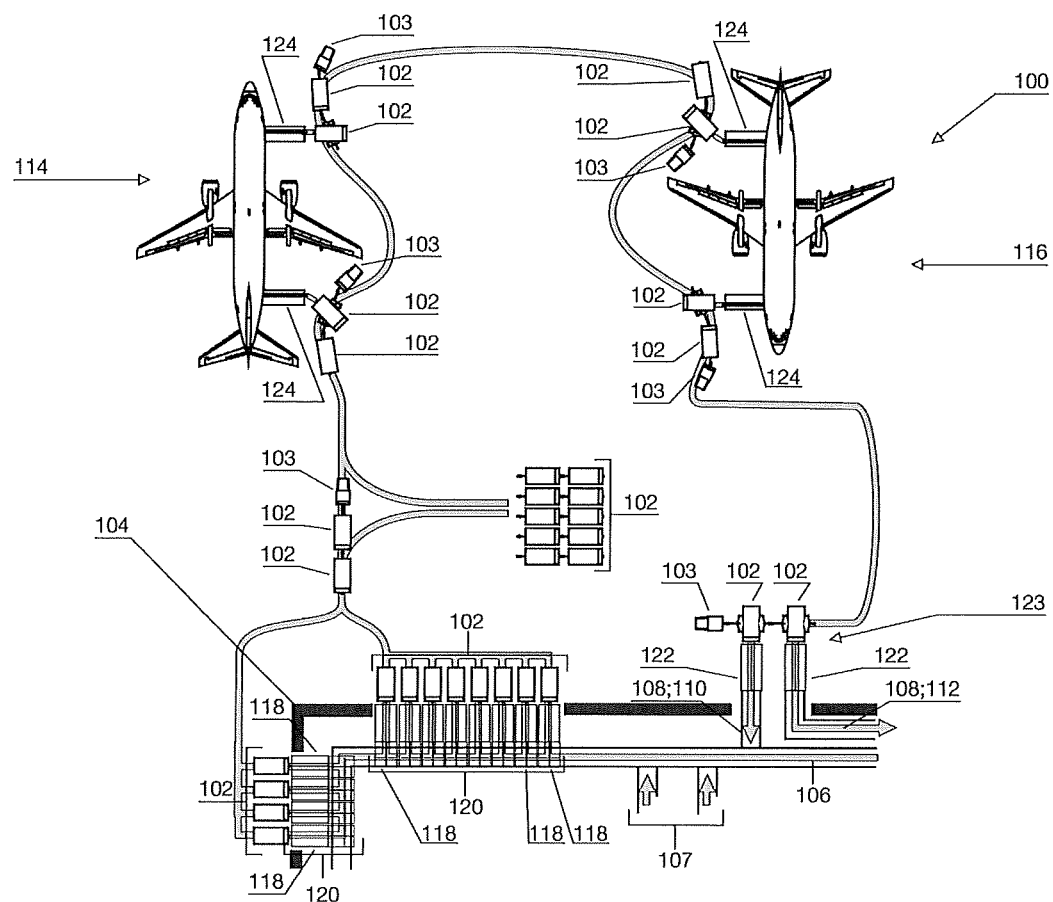
FIGS. 1 and 2 illustrate respective configurations of a system according to the present invention.
Figure 2:
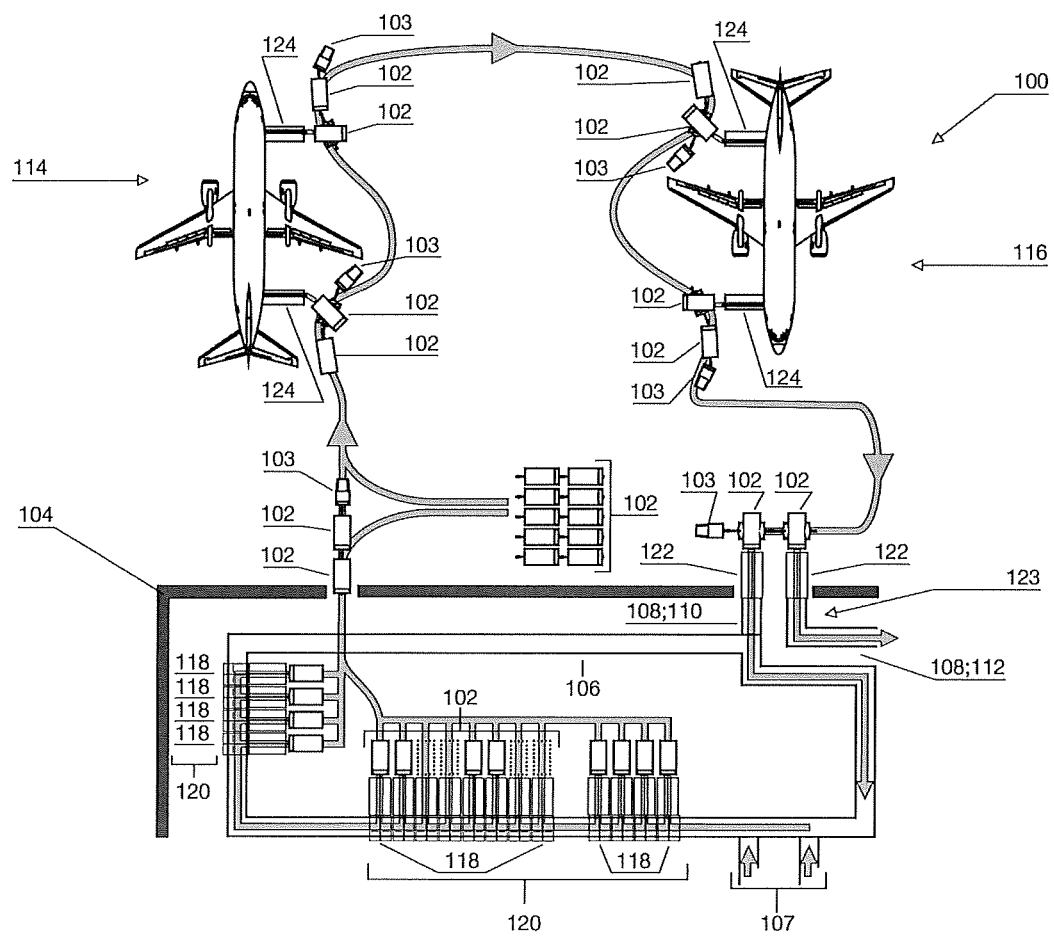

FIGS. 1 and 2 illustrate respective embodiments of a system 100 for handling of luggage or parcel items according to the invention. The system 100 comprises a plurality of carts 102 which may be coupled to form train of carts driven by tractors 103. In the embodiment of FIG. 1, the carts 102 are operated solely outside of a sorting hall building 104, and do not enter the building, whereas in the embodiment of FIG. 2, the carts 102 are operated inside and outside of the sorting hall building 104. The carts 102 are utilized for transferring items, such as airport luggage or parcels, between an aircraft site 114 or 116 and an item conveyor, which either constitutes a sorting conveyor 106 for departing luggage or a delivery conveyor 108 for arriving luggage. The aircraft site may include a departing aircraft site 114 or an arriving aircraft site 116. The sorting conveyor 106 comprises sorter inlets 107, also referred to herein as sorting conveyor inlet positions, which are connected to a luggage check-in site of the airport. Alternatively, the sorter inlets may be connected to a transit conveyor 110 as described below. The delivery conveyor 108 comprises two branches 110 and 112, of which conveyor branch 110 connects to the sorting conveyor 106, and branch 112 connects to a luggage reclaim area.

At unloading positions 120 of the sorting conveyor 106, the system 100 comprises a plurality of departure accumulation units 118 for accumulating items discharged from the sorting conveyor 106. One of said carts 102 is parked in a parking position in extension of each departure accumulation unit 118 with a loading end of the cart 102 arranged to accept items from the departure accumulation unit 118. Once loaded, the carts 102 may be coupled together to form trains of carts, which may be driven to the departure aircraft site 114 by means of tractors 103.

Arriving items are transferred from the arrival aircraft site 116 by means of trains of carts 102 to arrival accumulation units 122 for accepting items unloaded from the carts 102 and for further transfer thereof to the sorting conveyor-connecting branch 110 or to the reclaim conveyor branch 112, or to a parcel distribution facility (not shown), or to a further conveyor (not shown). The arrival accumulation units are provided at delivery conveyor loading positions 123 as indicated in FIGS. 1 and 2.

Belt loaders 124 may be provided at the aircraft sites 114, 116 in order to facilitate transfer of the items from the carts 102 into the aircraft and transfer of the items from the aircraft into the carts 102, respectively.

As described further below, the carts 102 comprise a wheeled chassis and a storage section, wherein the storage section is rotatable by at least 90° relative to the chassis around a vertical axis, so as to conveniently allow the storage section of the cart to be oriented as desired relative to the departure accumulation units 118, relative to the arrival accumulation units 122, and relative to the belt loaders 124. In preferred embodiments of the invention, each shelf of the cart 102 is configured to cause items supported thereby to be displaced from a loading end of the cart towards an unloading end thereof, i.e. to transfer the items when supported by the shelf in a cart-internal transfer direction. Likewise, each accumulation unit 118 and 122 may be configured to cause items supported thereby to be displaced from a loading end of the accumulation unit towards an unloading end thereof, i.e. to transfer the items when supported within the accumulation unit 118, 122 in an accumulation unit-internal transfer direction. The belt loaders 124 are configured to transfer the items in a belt loader transport direction. For loading and unloading of the carts, the cart-internal transfer direction is conveniently orientable in parallel to the accumulation unit-internal transfer direction and to the belt loader transport direction, respectively.

Figure 3A:
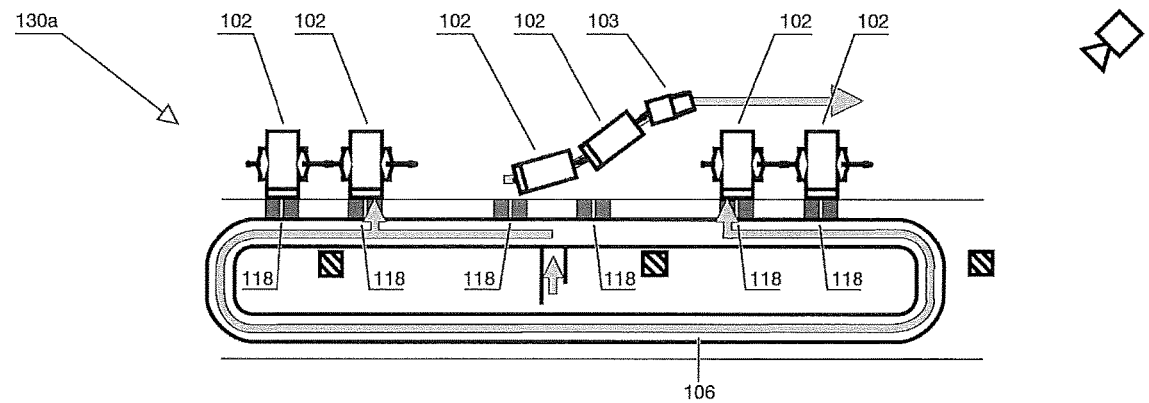
FIGS. 3a-3b, 4a-4b and 5a-5b illustrate three alternative configurations of a sorting conveyor portion of a system according to the invention.
Figure 3B:
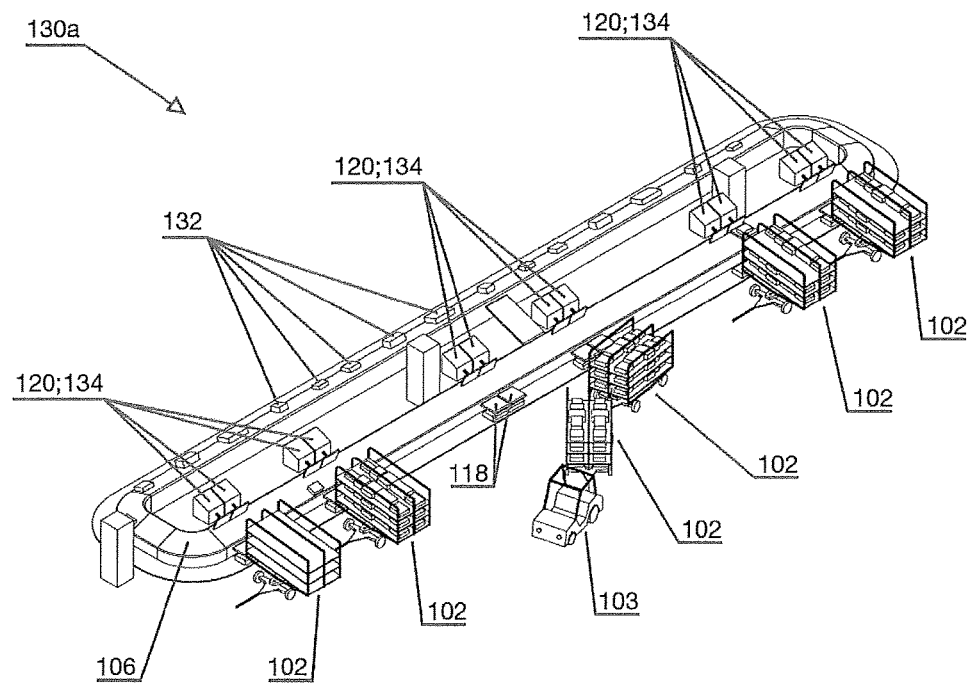
Figure 4A:
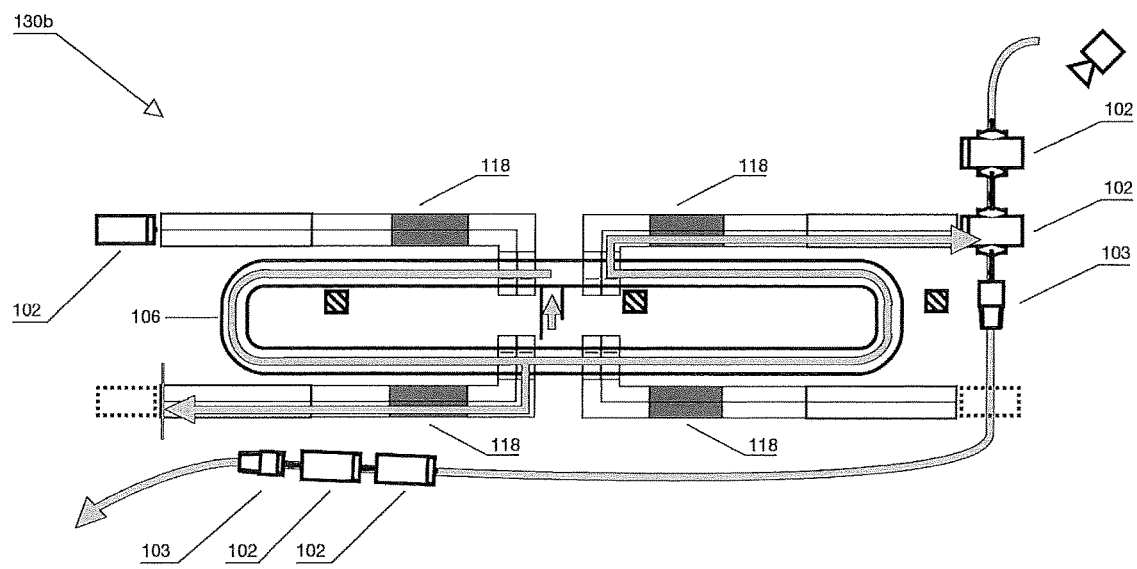
Figure 4B:
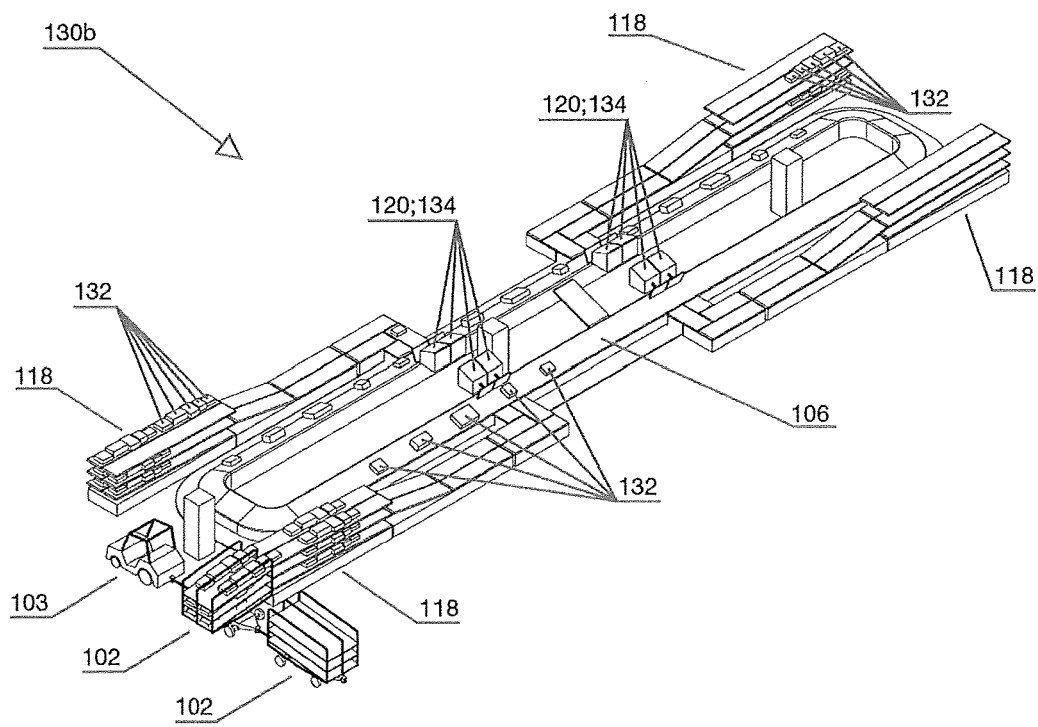
Figure 5A:
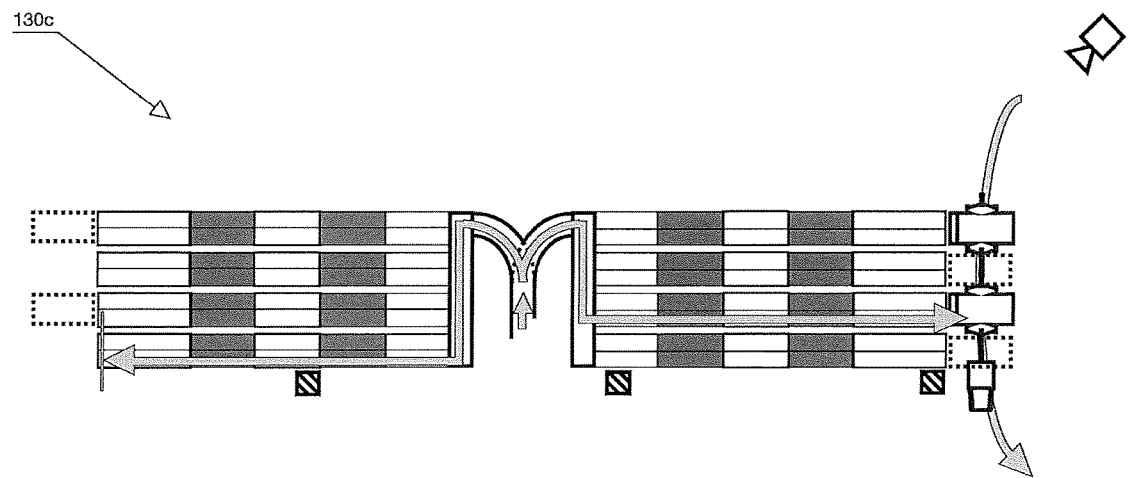
Figure 5B:
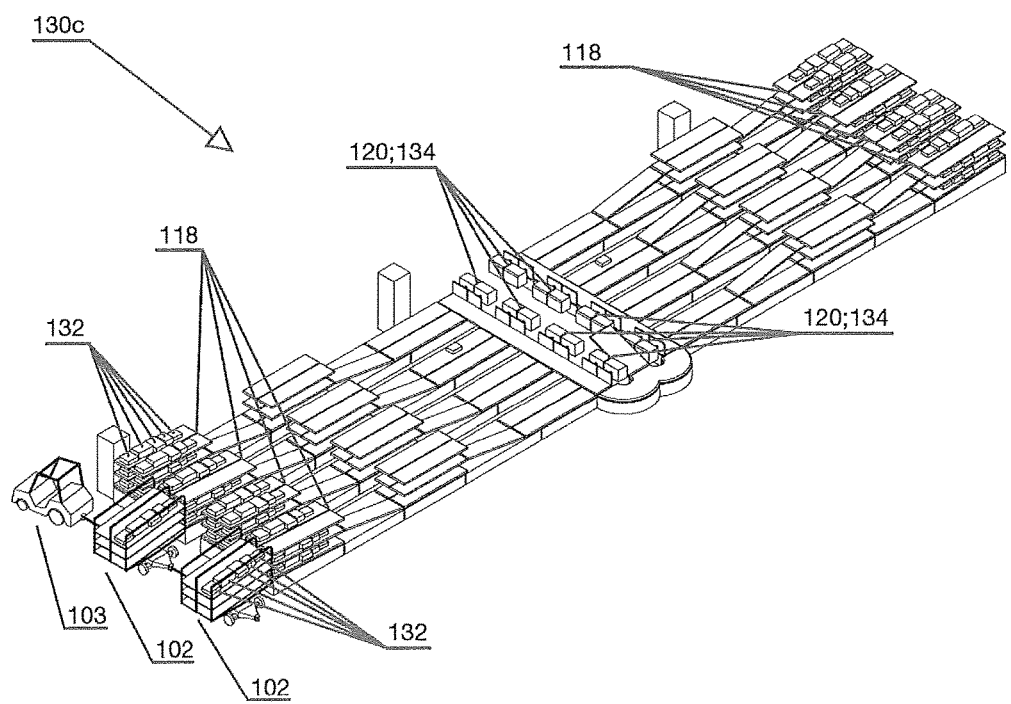
Figure 6:
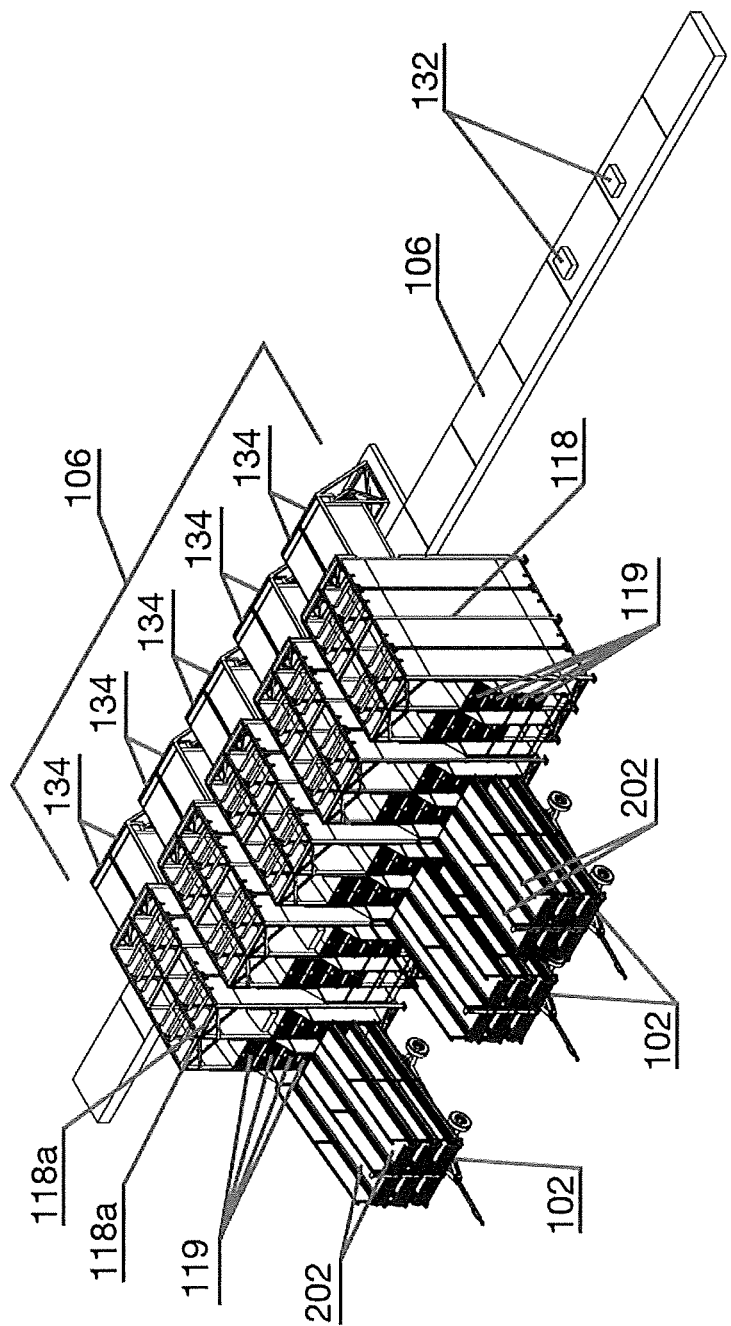
FIGS. 6, 7, 8, and 9a-9c illustrate a sorting conveyor unloading position with associated departure accumulation units of a system according to the invention.
Figure 7:
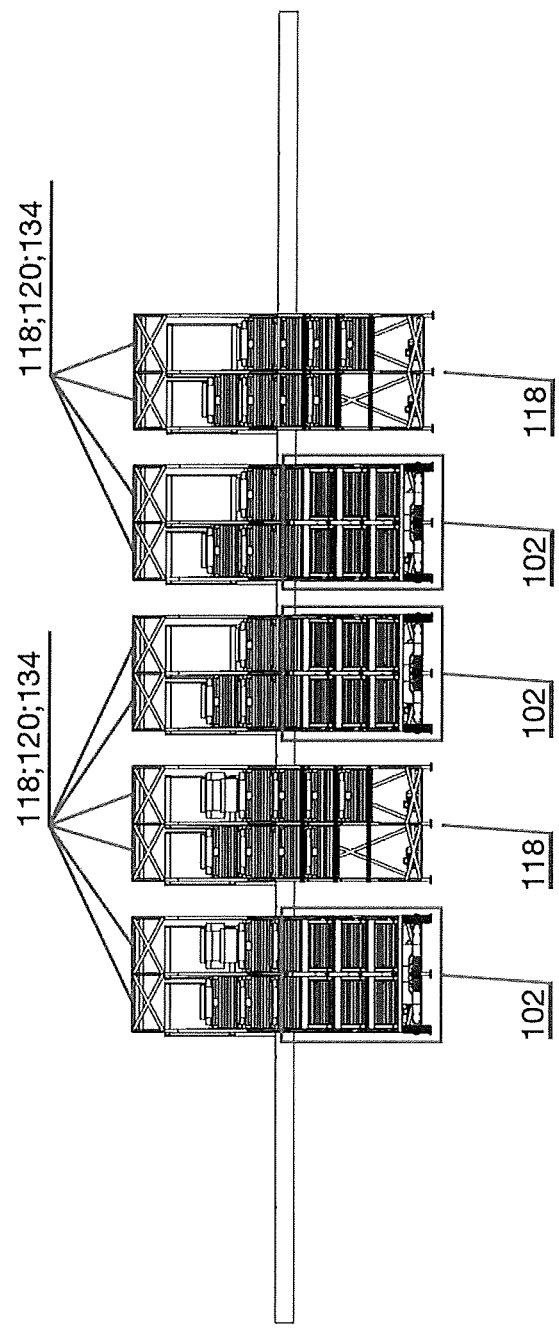
Figure 8:
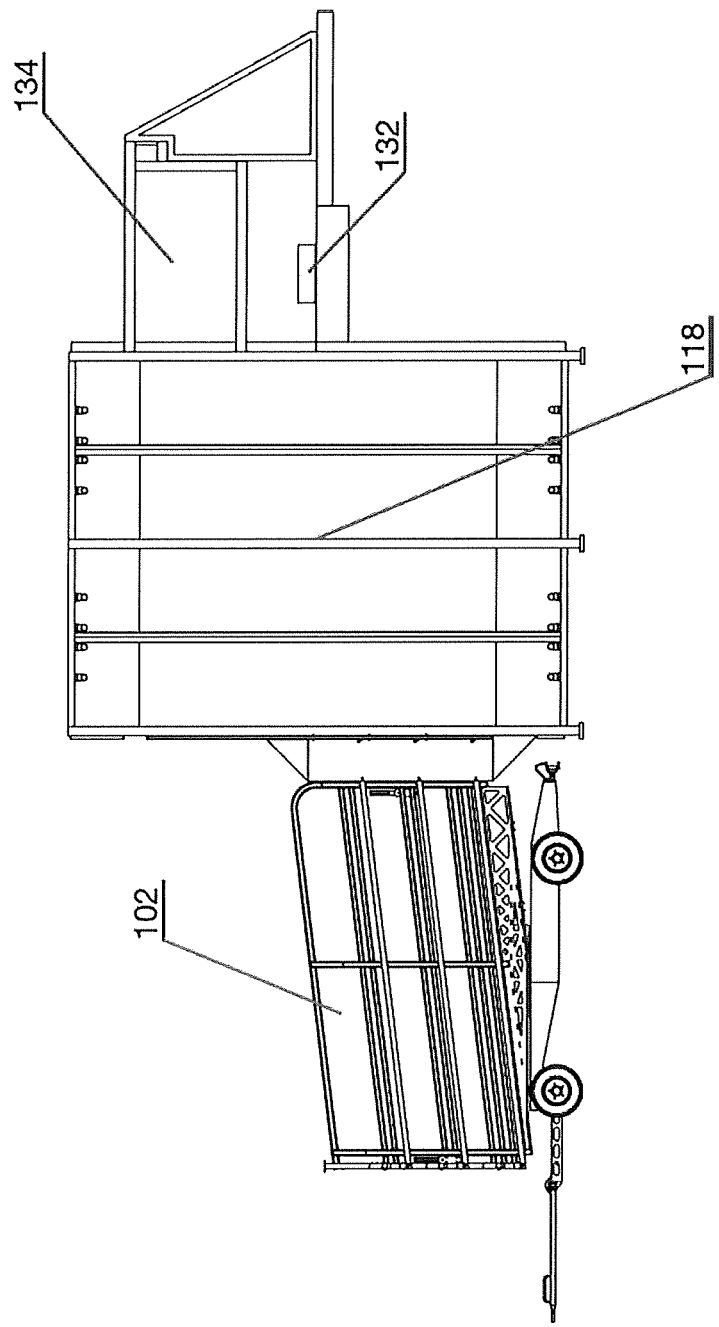

FIGS. 3a and 3b show a first layout 130a of a departure portion of the system 100 according to the present invention. FIGS. 4a and 4b show a second layout 130b of the departure portion of the system 100, and FIGS. 5a and 5b illustrate a third embodiment 130c of the departure portion of the system 100. In each of the layouts 130a, 130b, 130c items 132, such as luggage or parcels, are conveyed along and sorted by sorting conveyor 106. Departure accumulation units 118 are provided at each unloading position 120, whereby the items 132 are buffered in the departure accumulation units 118 once discharged from the sorting conveyor 106 and before being loaded onto the carts 102.

Figure 9A:
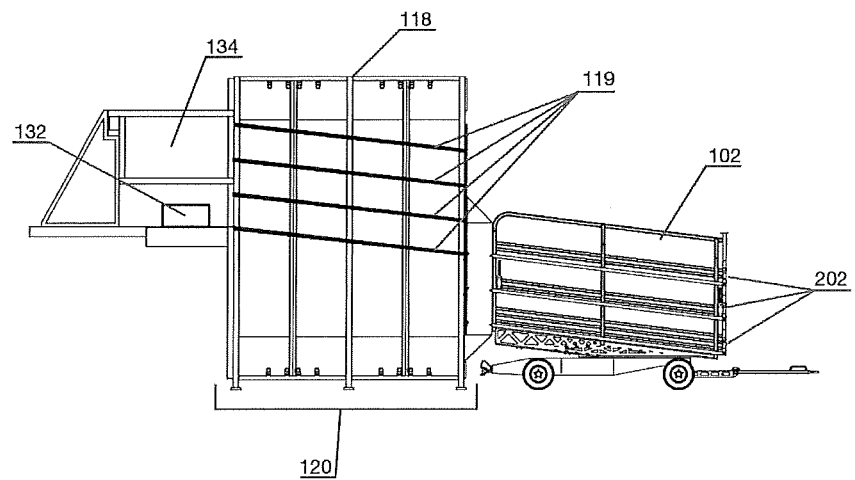
Figure 9B:
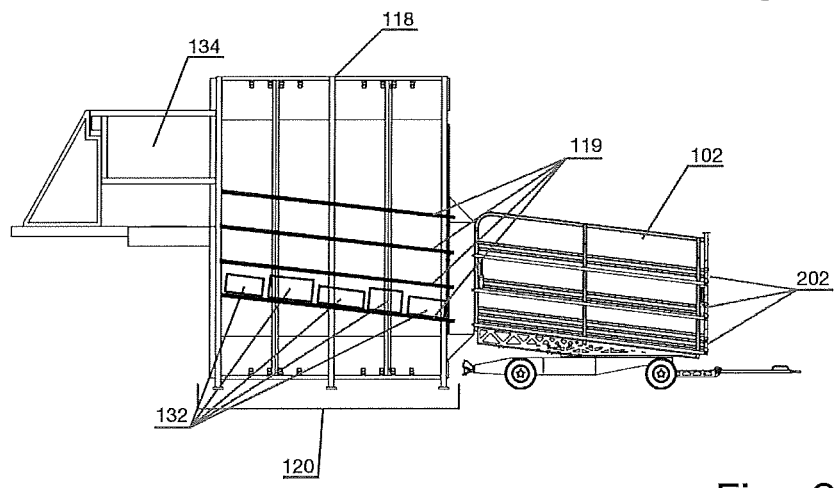
Figure 9C:
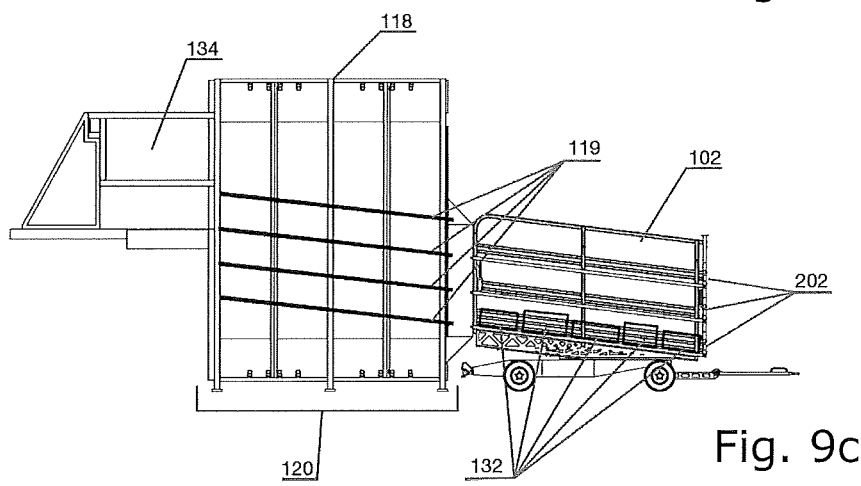

The departure accumulation units 118 and sorting conveyor unloading positions 120 are shown in further detail FIGS. 6-8 and 9a-9c. At each unloading position of the sorting conveyor 106, a pusher 134 is provided for discharging items 132 from the sorting conveyor 106 into the departure accumulation unites 118 in the direction of arrow 109 (see FIG. 9a). Operation of the sorting conveyor 106 and the pushers 134 is controlled by a control system (not shown), which discharges each of the items 132 into a departure accumulation unit assigned to a particular flight. For example, three of the five departure accumulation units 118 in FIG. 6 may be destined for a first departing flight, and the remain two accumulation units 118 may be destined for a second departing flight. The carts 102 are parked with their loading ends facing unloading ends of the departure accumulation units 118, whereby items 132 buffered by accumulation shelves 119 of the departure accumulation units 118 may be transferred to cart shelves 202 of each of the carts 102. Each departure accumulation unit 118 comprises a matrix structure of rows and columns 118a and 118b of a plurality of accumulation shelves 119. As shown in FIGS. 9a-9c, the accumulation shelves 119 of the departure accumulation unit 118 are permanently inclined, so as to enable items 132 supported by the shelves to be automatically displaced under the action of gravity from a loading end of each shelf towards an unloading end thereof. Each column of shelves 119 is preferably up- and downwardly displaceable as shown by the double arrow 121 in FIG. 9b. The vertical displacement 121 of each column of shelves 119 may be controlled by the control system of the sorting conveyor 106 and coordinated with the control of the operation of the pushers 134, so as to enable the selection of a particular shelf 119 for each item 132 discharged from the sorting conveyor 106 into the departure accumulation unit 118.

Once released from the departure accumulation units 118, the items 132 are allowed to slide onto the cart shelves 202 of each of the carts 102 under the action of gravity as indicated by arrow 111 in FIG. 9c. The shelves may additionally or alternatively be equipped with individually controllable conveyor belts.

It will be appreciated from the above description that the transfer of items from the sorting conveyor 106 onto the carts 102 may hence occur in a fully automated manner with no manual labour intervention.

Figure 10A:
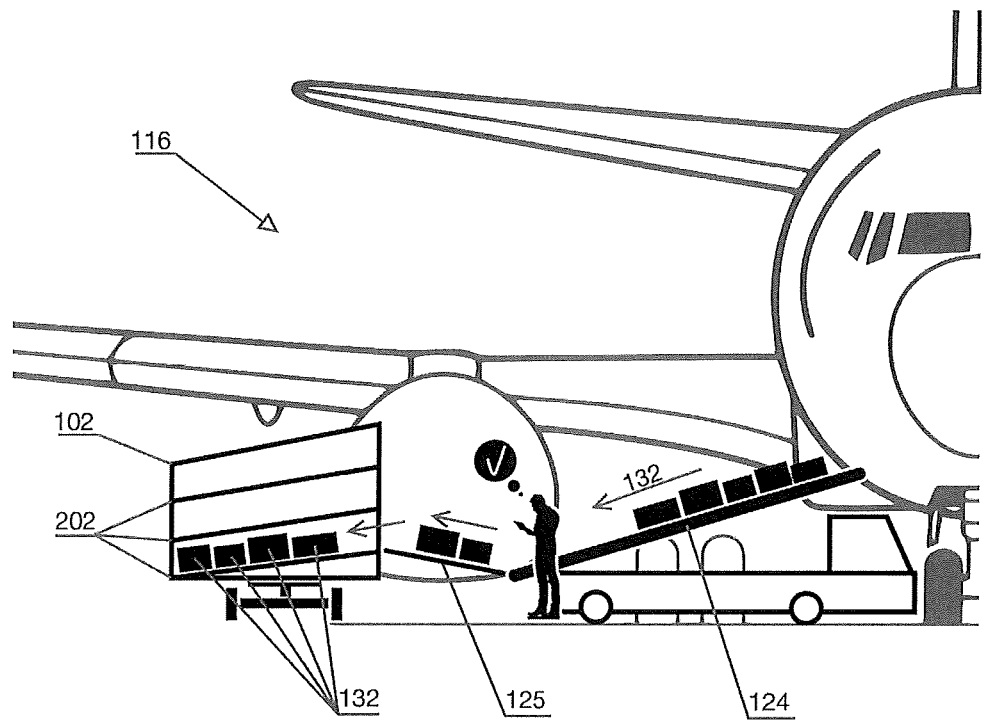
FIGS. 10a and 10b illustrate aircraft loading and unloading of items at an aircraft arrival and an aircraft departure site.
Figure 10B:
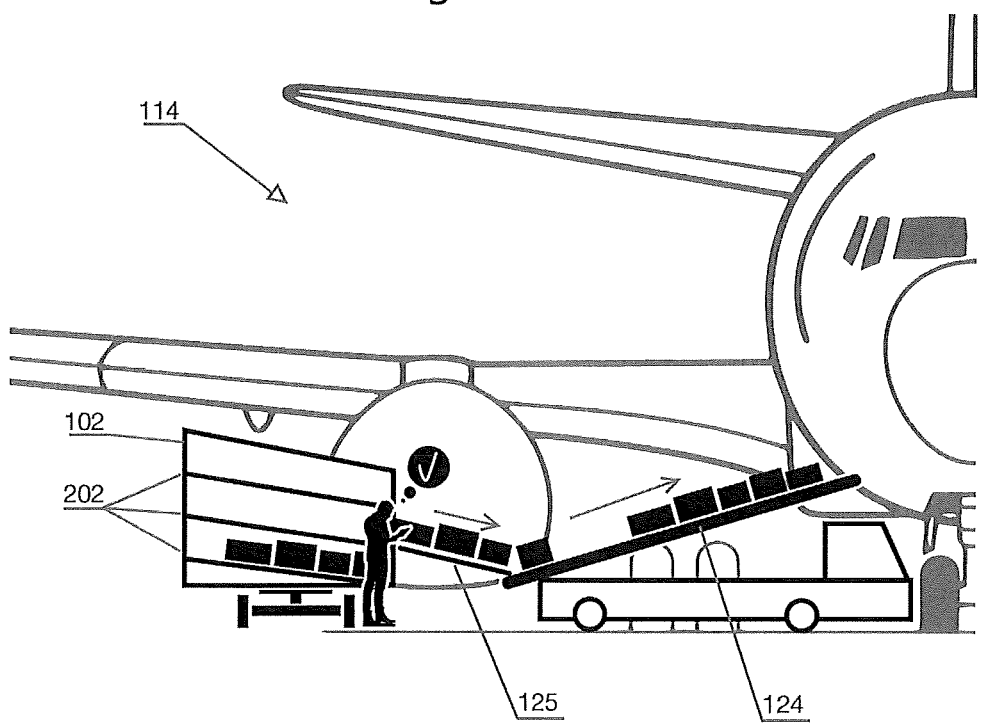

FIGS. 10a and 10b illustrate the handling of the items 132 at the aircraft departure site 116 (FIG. 10a) and at the aircraft arrival site 114 (FIG. 10b). As shown in FIG. 10a, items 132 are offloaded from an arriving aircraft by means of belt loader 124 and transferred to the cart shelves 202 of cart 102 by means of connecting conveyor 125.

The system of the present invention hence also enables the transfer of items from the carts into the cargo hold of the aircraft in a nearly automated manner with no need for manual handling or lifting of items. Manual labour intervention may thus be limited to rotation of the storage section of the cart relative to the chassis, unless such rotation is motor driven, and possibly to handling of the connecting conveyor 125, such as successive alignment thereof with each one of the cart shelves. Such handling of the connecting conveyor may also be automated. The connecting conveyor 125 may form a branched structure with respective connecting conveyor branches extending to each one of the cart shelves.

Figure 11A:
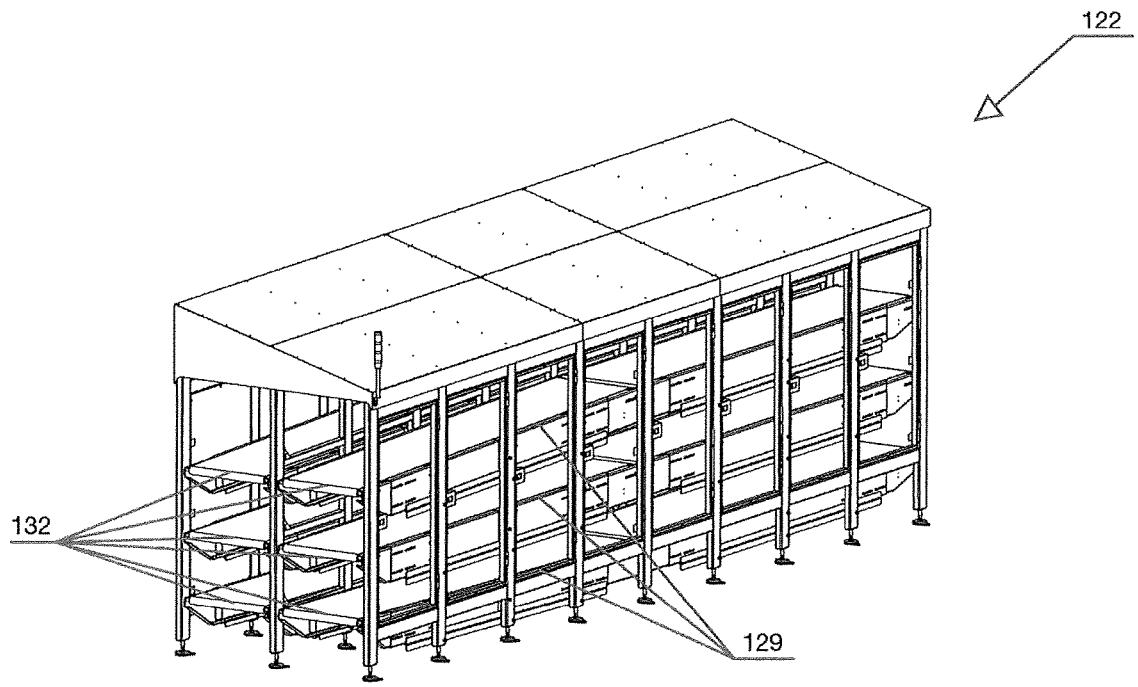
FIGS. 11a-11b and 12a-12c illustrate embodiments of an arrival accumulation unit of a system according to the present invention.
Figure 11B:
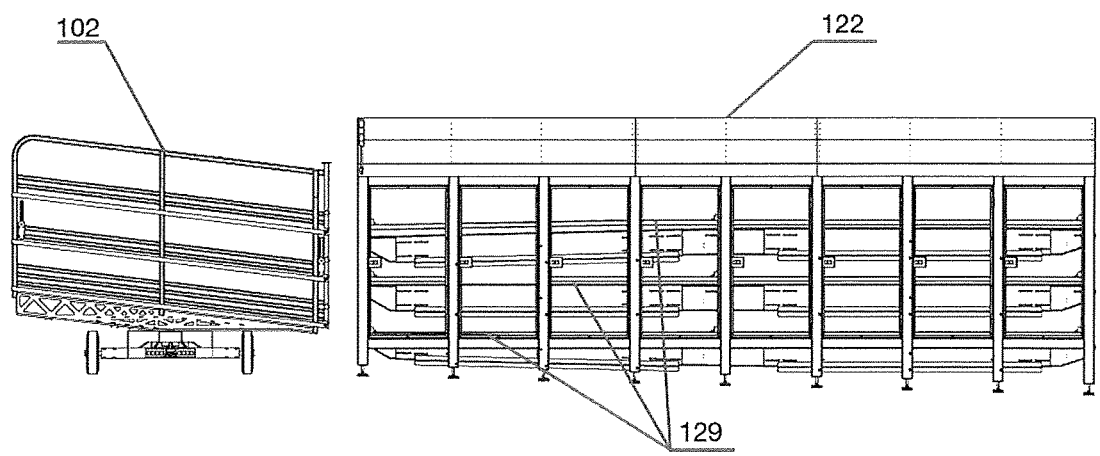
Figure 12B:
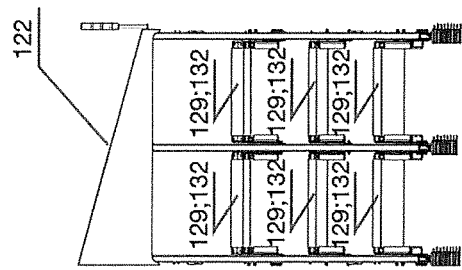
Figure 12A:
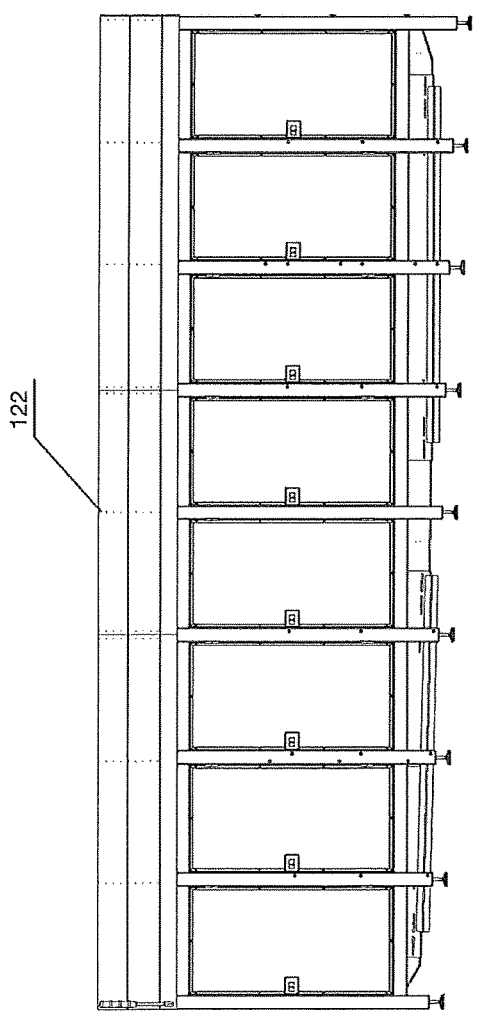
Figure 12C:
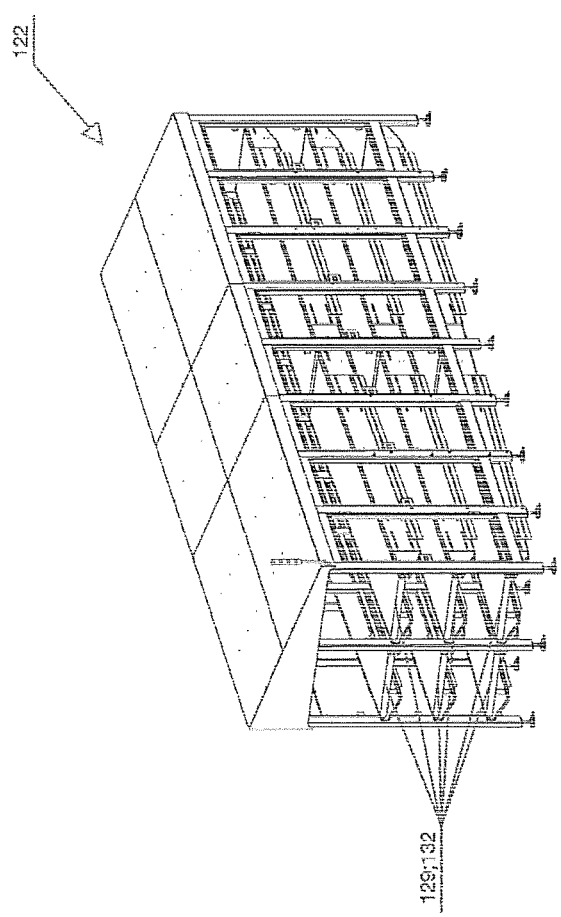

An embodiment of the arrival accumulation unit 122 is illustrated in FIGS. 11a, 11b, 12a-12c, and 13. The arrival accumulation unit 122 comprises a plurality of accumulation shelves 129 arranged in a matrix of rows and columns. Each shelf comprises a motor-driven conveyor belt 136, operation of which is preferably independently driveable and controllable by, e.g. an operator of the unit through an operator interface. The arrival accumulation unit 122 comprises an item loading end (to the left in FIGS. 11a, 11b and 12c) and an item off-loading end (to the right in FIGS. 11a, 11b and 12C). As illustrated in FIG. 11b, the loading end of the arrival accumulation unit 122 mates with the unloading end of the cart 102, with the number and layout of the shelves 202 of the cart 102 matching the number and layout of the shelves 129 of the arrival accumulation unit 122. The arrival accumulation unit 122 may thus receive items 132 offloaded by the cart 102. Hence, also as regards the transfer of items from the aircraft onto the delivery conveyor of an airport, all handling of the items is automated.

Figure 13:
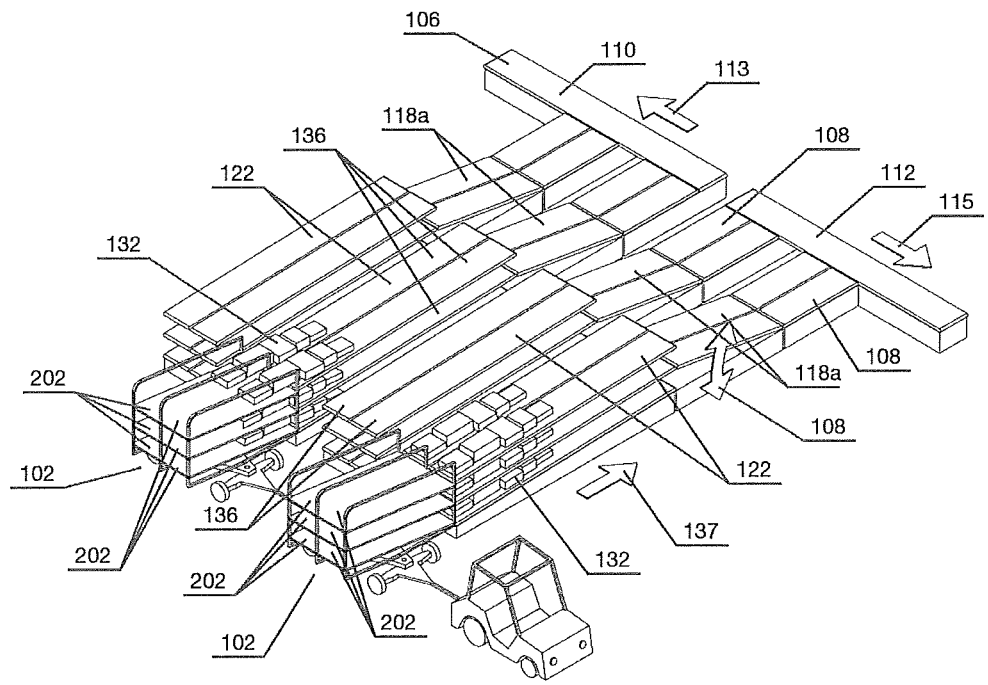
FIG. 13 illustrates the flow of arriving items at a delivery conveyor of a system according to the present invention.
Figure 16:
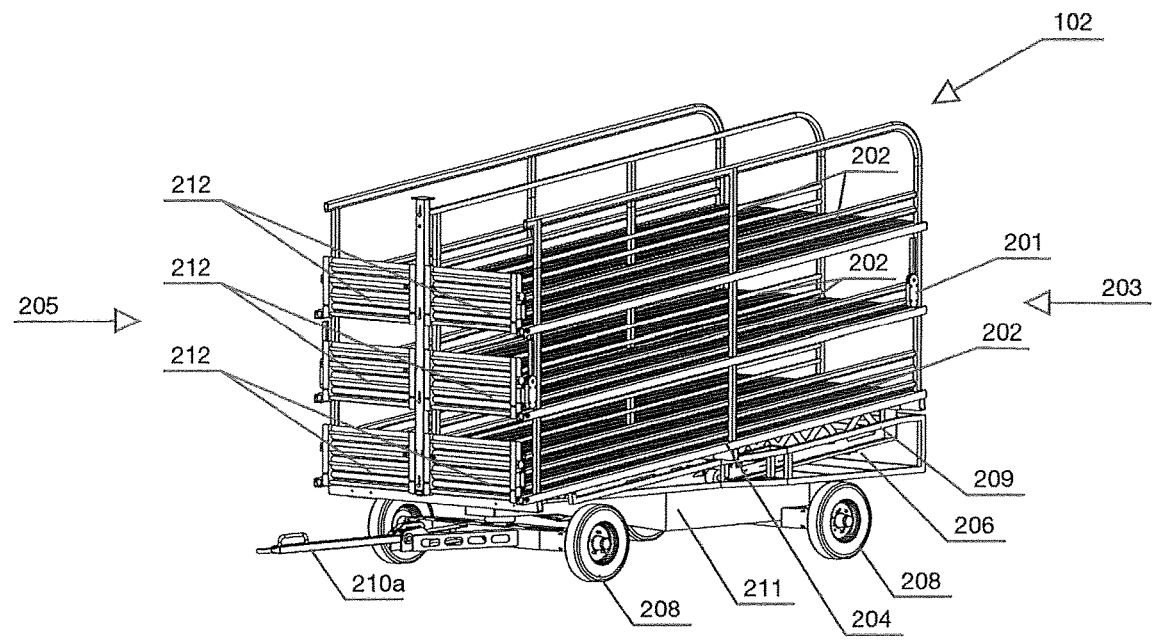
FIGS. 16-23 illustrate a cart for use in a system according to the present invention.

The arrival accumulation unit 122 is generally illustrated in FIG. 13. Arriving items 132 are off-loaded from cart shelves 202 of carts 102 by discharge thereof onto belts 136 of arrival accumulation unit shelves 119. Within the arrival accumulation unit 122 the items 132 are buffered on belts 136, which convey the items in the direction of arrow 137. Delivery conveyor 108 comprises an inclinable conveyor section 108a configured to accept items 132 from selected pairs (one row at a time) of arrival accumulation unit shelves and belts 119, 136. In FIG. 13, the two lower right delivery conveyors 108 are connected to conveyor branch 112 for transferring arriving items 132 to a local luggage reclaim area, parcel distribution facility or the like (not shown) as indicated by arrow 115. The two upper left delivery conveyors 108 are arranged to transfer incoming transit items onto the sorting conveyor 106 for further sorting and subsequent re-departure thereof. The inclination of the cart shelves 202 provide an item transfer structure together with releasable closure structures 212 (see FIG. 16), by means of which the items 132 may be offloaded from the cart 102 by sliding of the cart shelves 202 under the action of gravity.

Figure 14:
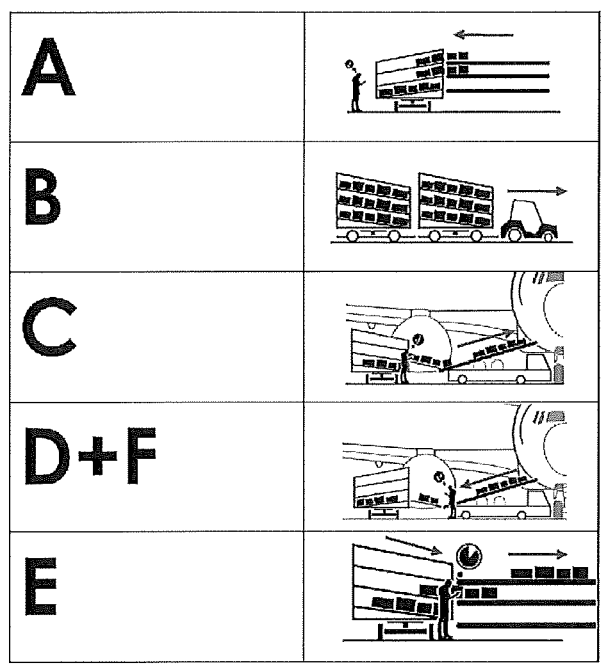
FIG. 14 illustrates basic operating steps in the processing of items through a system according to the invention.

FIG. 14 illustrates five fundamental steps of operation of the system 100 according to the present invention as follows:

STEP A: transfer of departing items from the departure accumulation unit 118 onto the cart 102 at a sorting conveyor site.

STEP B: transfer of a train of carts from the sorting conveyor site 106 to the aircraft departure site.

STEP C: transfer of the departing items from each cart onto a belt loader and further into the cargo hold of an aircraft.

STEPS D AND F: transfer of arriving items from the aircraft cargo hold into the carts.

STEP E: transfer of the arriving items from the carts into the arrival accumulation unit.

Figure 15:
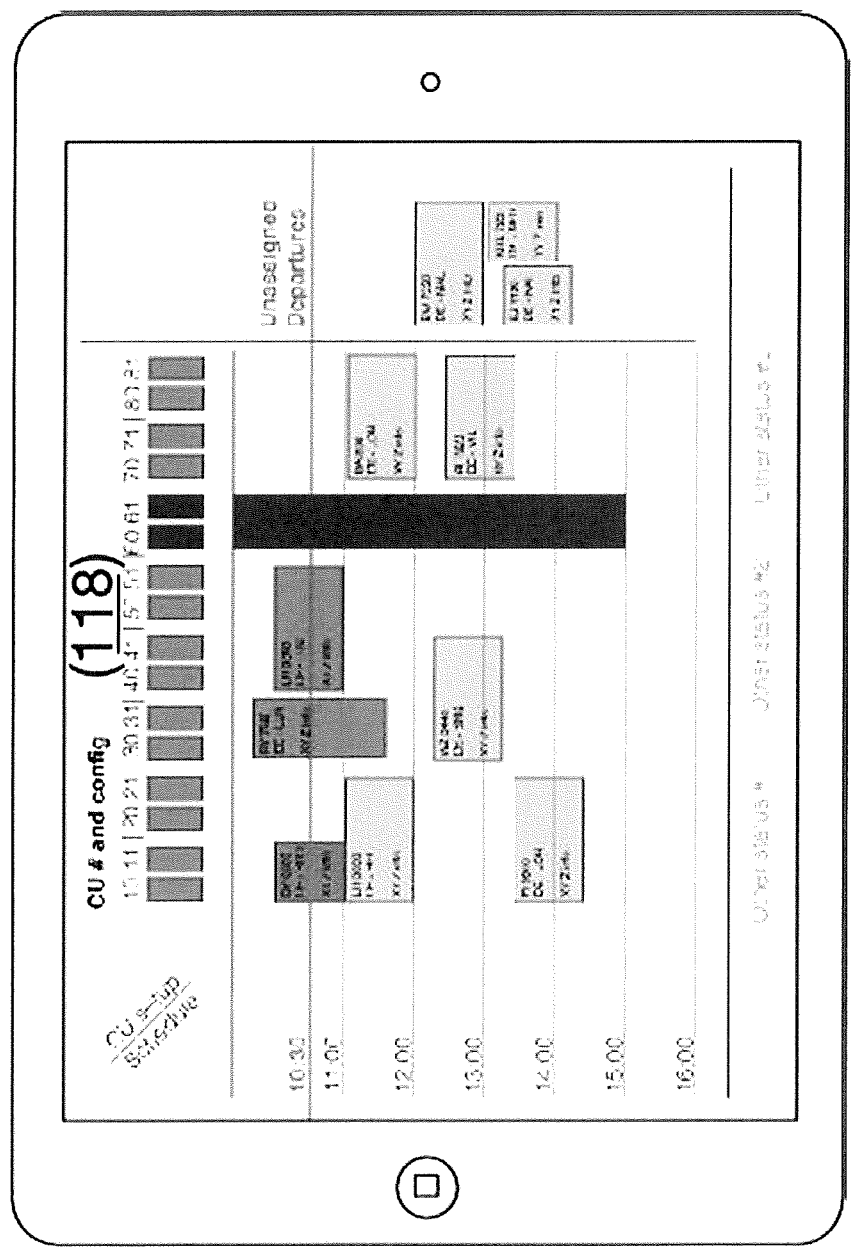
FIG. 15 illustrates a control interface of a control system for controlling operation of a sorting conveyor and departure accumulation units of a system according to the present invention.

FIG. 15 illustrates a control scheme interface of the sorting conveyor 106 and departure accumulation units 118 of a system according to the present invention. A number of departure accumulation units numbered 10, 11, 20, 21, 30, 31, 40, 41, 50, 51, 60, 61, 70, 71, 80 and 81 are provided at respective unloading positions of the sorting conveyor 106. In the configuration shown, each of the departure accumulation units comprises two columns of shelves. As shown, departure accumulation units Nos. 10 and 11 are designated for a first flight until 11:00 o'clock. From 11:00 until 12:00 departure accumulation units Nos. 10, 11, 20 and 21 are designated for a second flight, and the same four units are designated for a third flight from 13:30 until 14:30. Likewise, departure accumulation units Nos. 30, 31, 40, 41, 50, 51, 70, 71, 80 , and 81 are designated to various flights at various time slots. Departure accumulation units Nos. 60 and 61 are out of service for maintenance. As shown at the right-hand side of the interface, three flights have not yet been assigned to any departure accumulation units.

Figure 19:
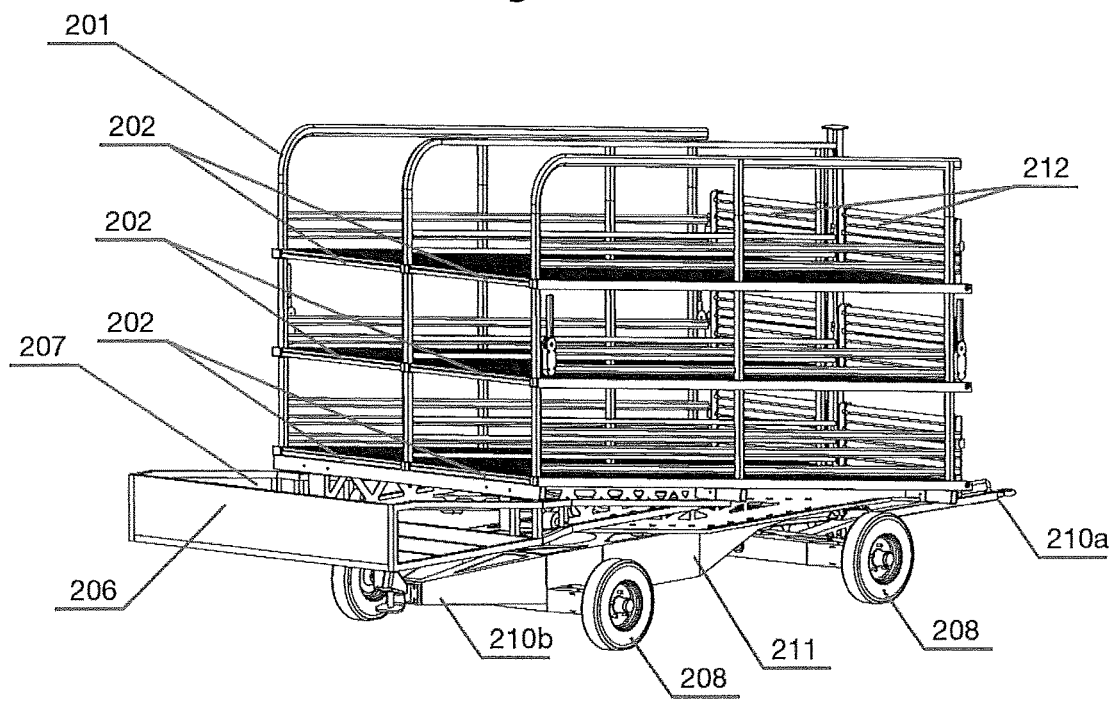

FIGS. 16-23 illustrate various embodiments of the cart 102 for use in the system 100 of the present invention. The cart 102 comprises a storage section 201 comprising a plurality of cart shelves 202, each of which is inclined relative to horizontal for automatically conveying items from an upper loading end 203 of the cart 102 towards a lower unloading end 205 thereof. The cart comprises a chassis 211 and a plurality of ground-engaging wheels 208, and a drawer 206 below the storage section 201. The drawer 206 comprises a compartment 207 (see FIG. 19) for accepting odd-size items when the drawer is in the open state as shown in FIG. 19. In the non-retracted, i.e. closed state of the drawer 206 shown in FIGS. 16-18, the compartment 207 is inaccessible, and the drawer is overlapped by a bottom portion 204 of the storage section 201. In the retracted, i.e. open configuration shown in FIG. 19, the compartment is accessible.

In use, the cart may be selectively operated with the drawer 206 in its open or in its closed state. Typically, ordinary items, such as suitcases and ordinary bags are loaded onto the shelves 202. If no odd-size or over-size items are to be transferred by the cart 102, it is normally operated with the drawer 206 in the closed state. For the transfer of odd-size or over-size items by means of the cart 102, it is operated with the drawer 206 in the open, i.e. retracted state as shown in FIG. 19 with the odd-size or over-size items resting in and extending upwardly from the compartment 207.

The drawer 206 has inclined side structures 209 which are configured to essentially correspond and extend in parallel to the inclined bottom surface 204 of the storage section 201.

A connecting element 210a is provided for coupling a first end of the cart 102 to a suitably configured connecting element 210b of the opposite end of an identical cart 102 to form a train of carts. As illustrated by arrow 214. At the unloading end 205, each of the shelves 202 is provided with a releasable and re-closable closing structure 212 for releasing the items supported by the respective shelves when the items are to be offloaded from the cart 102.

Figure 17:
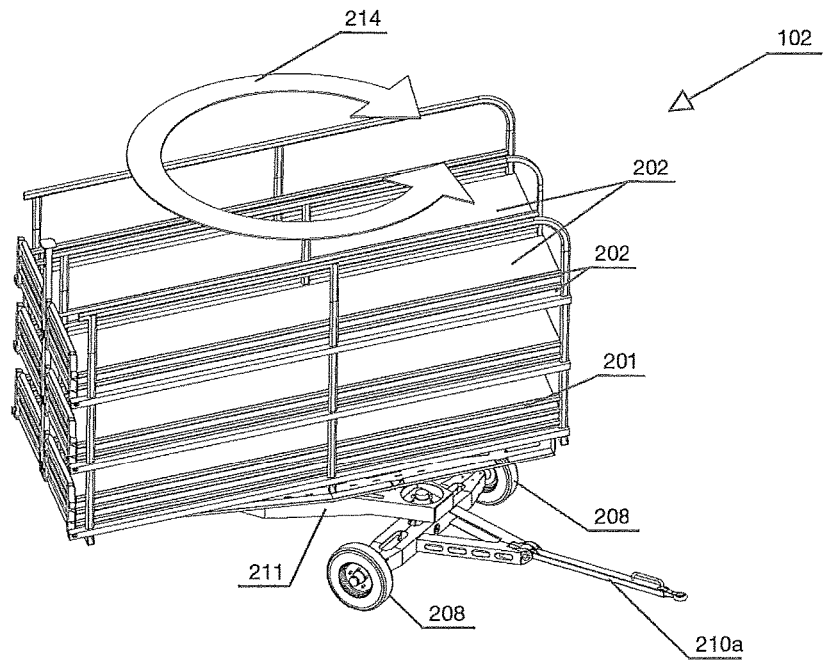
Figure 18:
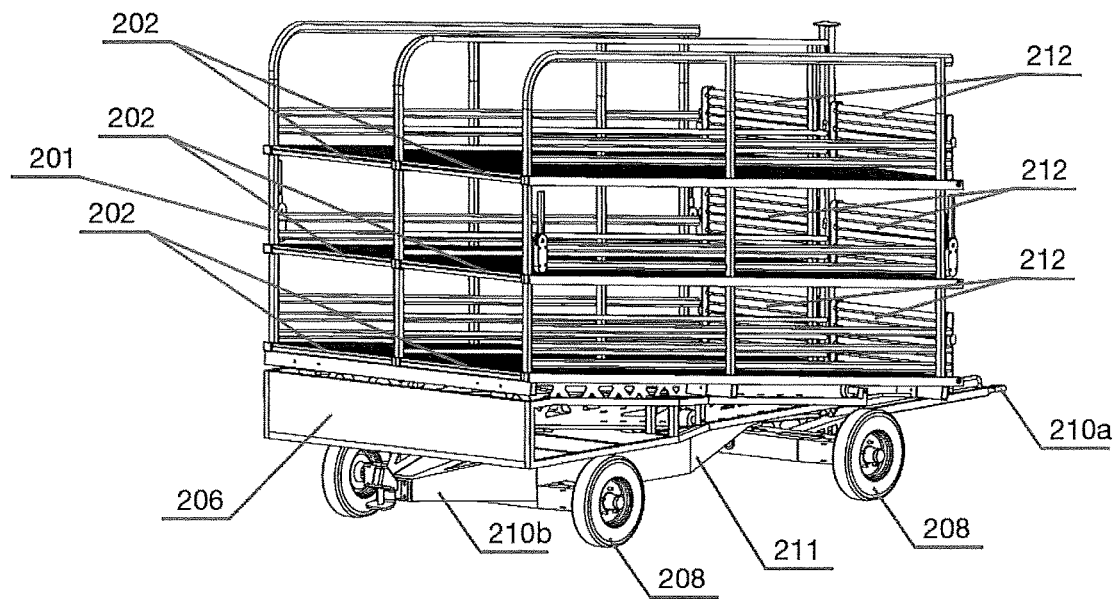

The storage section is preferably rotatable relative to the chassis 211 around an upright axis as shown by arc-shaped arrow 214 in FIG. 17 in order to orient the shelves and the transport direction of items within the cart relative to an external conveyor or accumulation means, such as an accumulation unit, belt loader or the like.

At least two carts 102 may be coupled or connected together to form a train of carts. A structure (not shown) for releasably locking the drawer in a selected one of a partly extracted position and a fully extracted position may be provided. For coupling the carts together to form a train of carts, the connecting element 210a, 210b may be provided, the free end of which is configured to connect the cart to another cart, the connecting element extending from the chassis 211 of the cart 102 below the drawer 206 in the direction of extraction of the drawer. The free end of the connecting element 210a, 210b is able to connect to another one of the carts when the drawer 206 is in the partly extracted position, whereas the free end of the connecting element 210a, 210b is unable to connect to the other one of the carts when the drawer 206 is in the fully extracted position. In operation, items may be selectively transported with the drawer in the fully or in the partly extracted position. When the drawer is in the partly extracted position, the first cart may be coupled to a second one of the carts by means of the connecting element with the drawer of the first cart facing the second cart. When the drawer is in the fully extracted position, items may be transported therein when the cart is not coupled to a further cart, or when the cart constitutes a first cart, which is coupled to a second cart by means of the connecting element with the drawer of the first cart facing away from the second cart. The length of the drawer, which may be as long as the cart or nearly as long as the cart may hence be fully utilized when the cart is the last one in a train of carts of is used as a stand-alone device, whereas the full length of the drawer does not occupy excessive space between neighbouring carts in a train of carts and hence does not unnecessarily limit the radius of curvature of the train.

Figure 20:
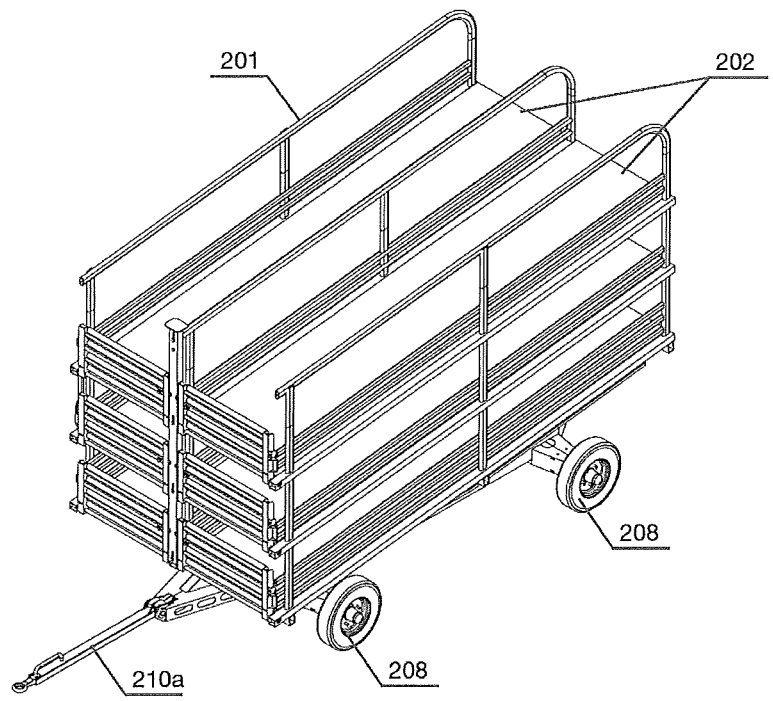
Figure 21:
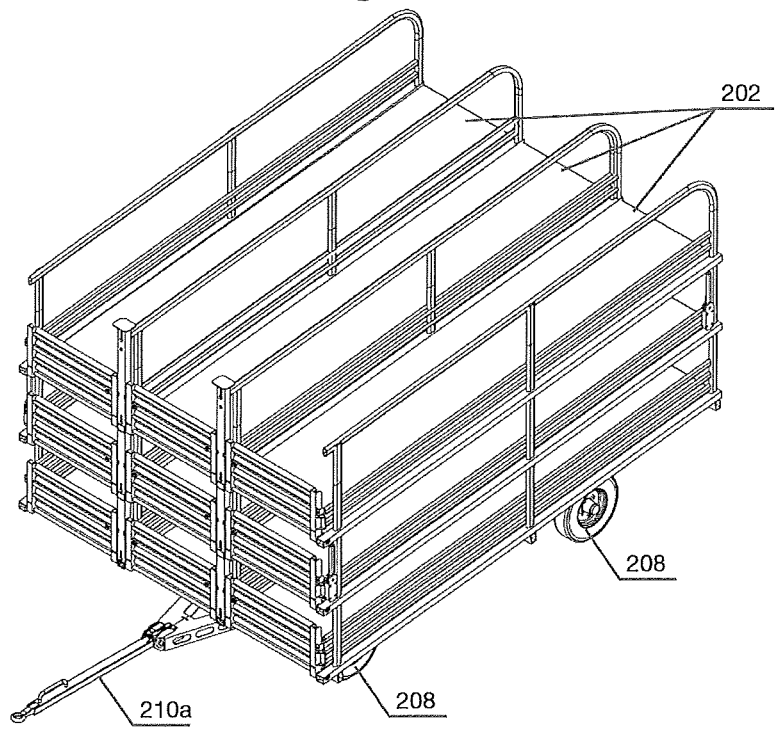
Figure 22:
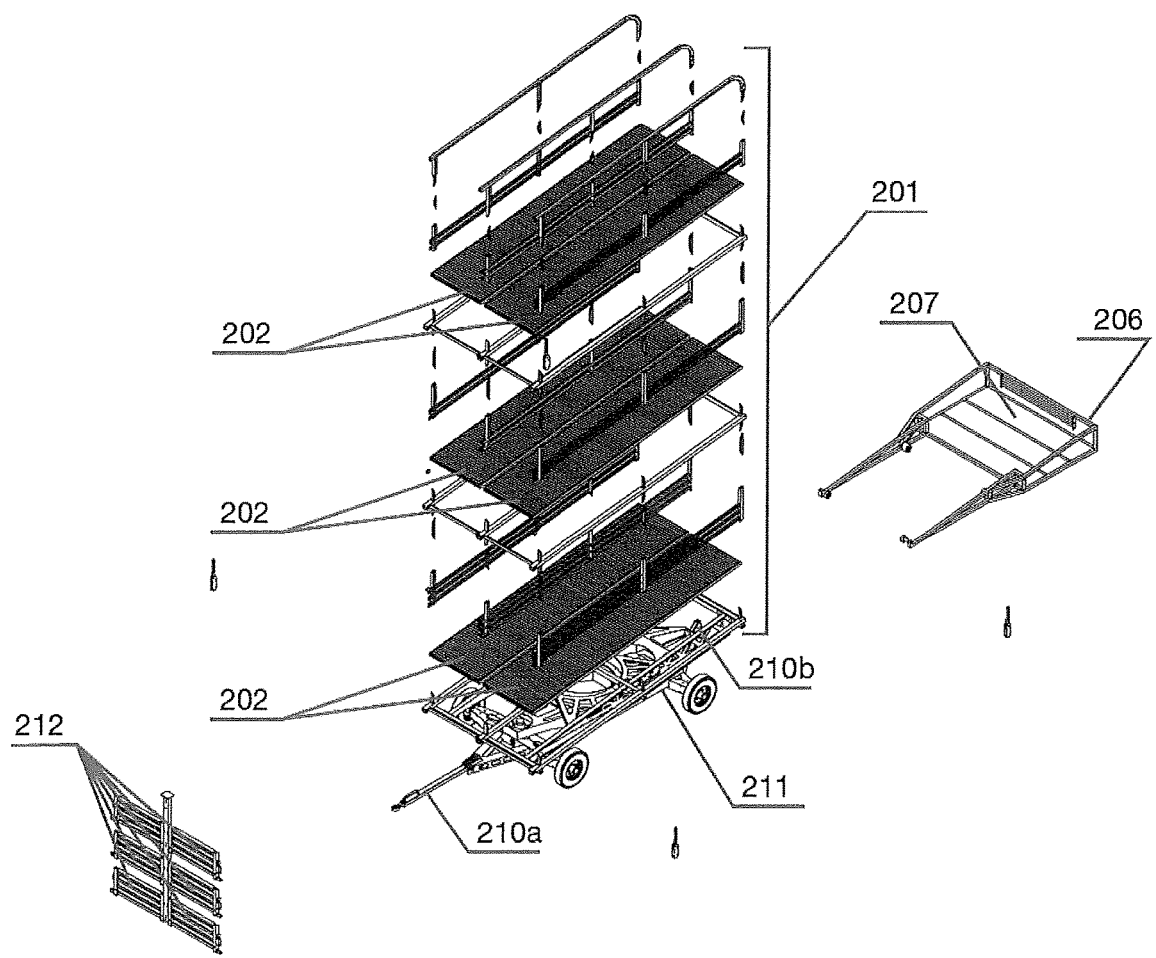

FIGS. 20 and 21 show two embodiments of the cart 102. In a first configuration shown in FIG. 20, the cart comprises two columns each comprising three rows of cart shelves 202, and in the embodiment of FIG. 21, the cart comprises three columns of cart shelves 202, each comprising three rows. In order to conveniently adapt the number of rows and columns to match any desired need, the cart may—as shown in FIG. 22—be assembled from a number of modules which may be configured and sized to match the need as given by a particular application.

Figure 23:
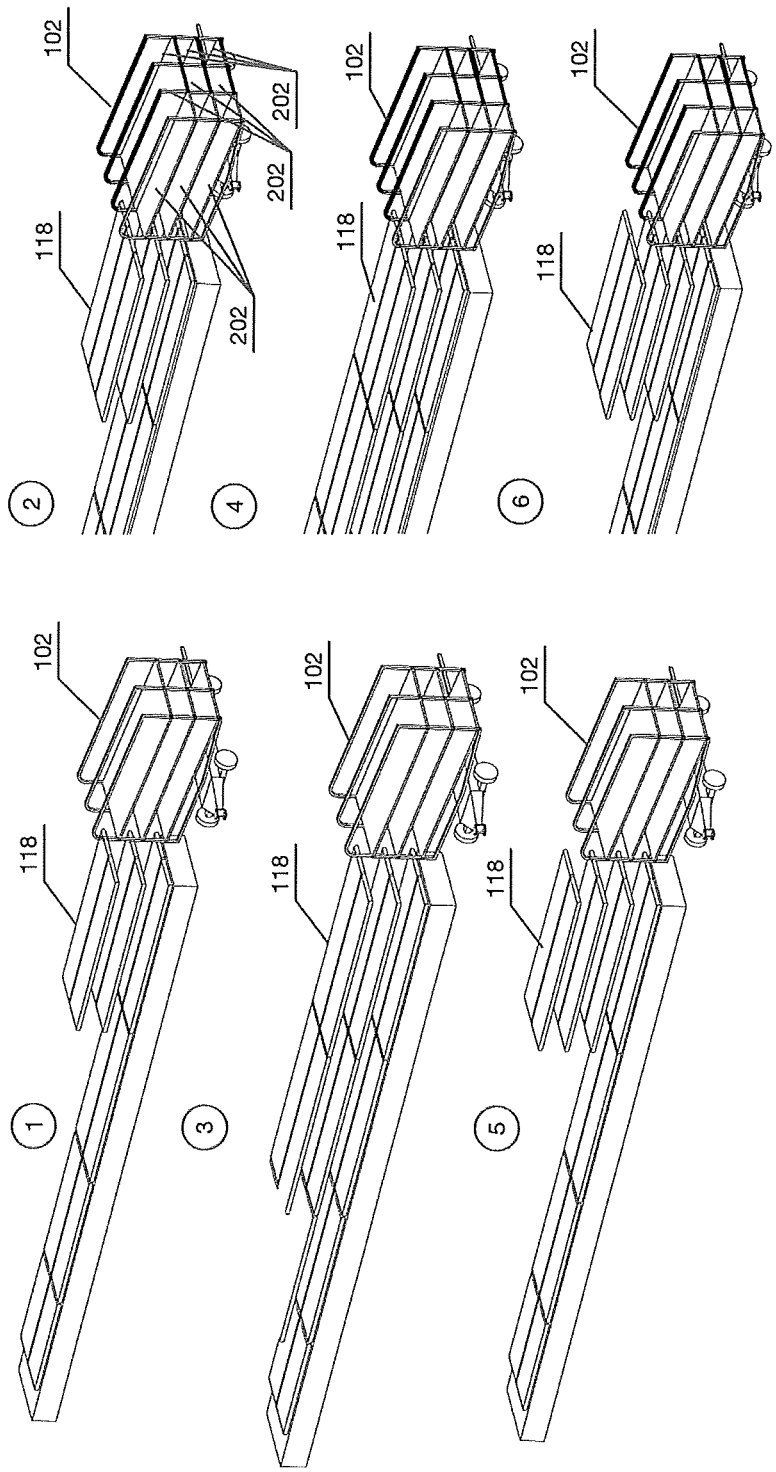
Figure 24:
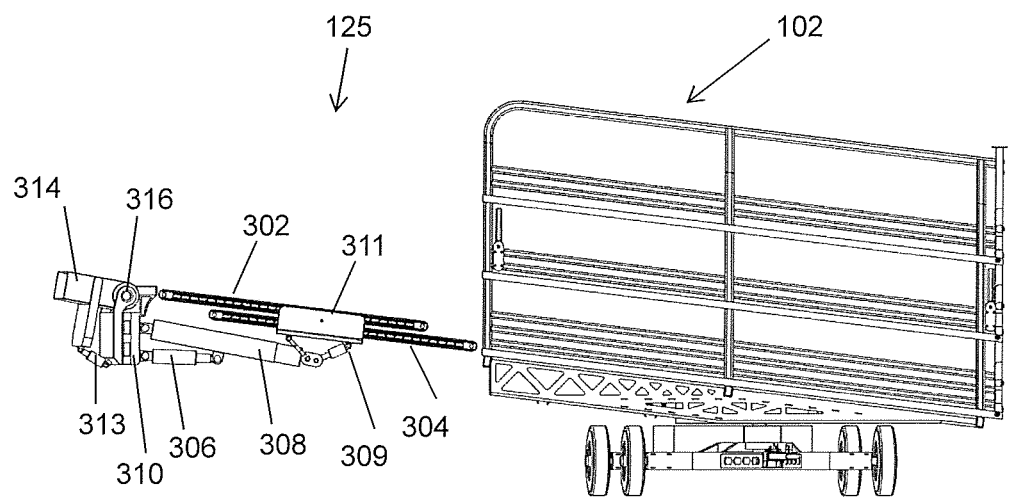
FIGS. 24-34 illustrate a first embodiment of a connecting conveyor—i.e. a so-called ramp connector—for use in a system according to the present invention.
Figure 25:
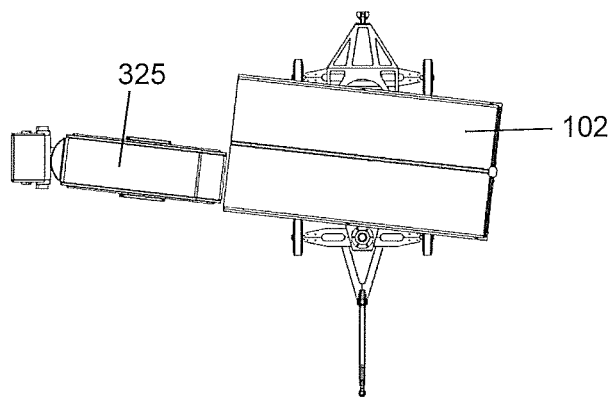
Figure 26:
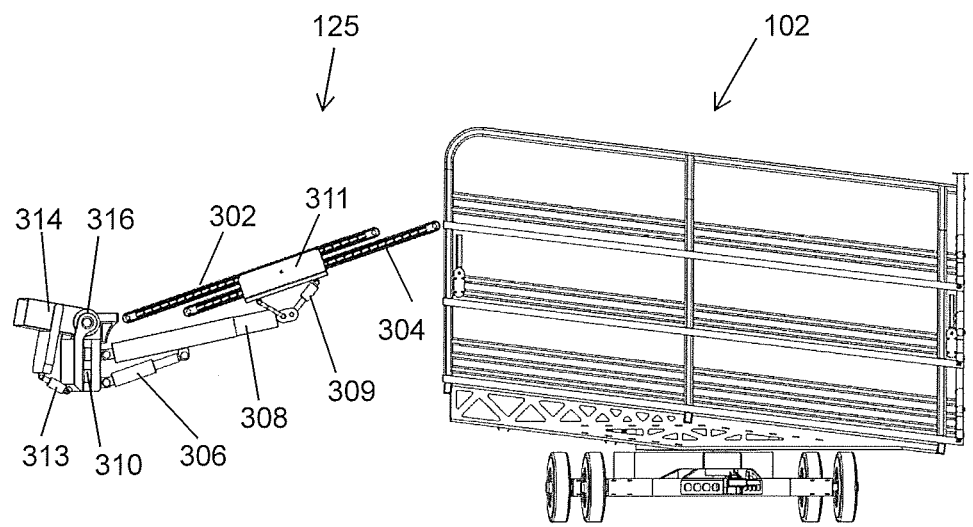

FIG. 23 shows various configurations of the cart 102 in a parking position in front of an accumulation unit 118 or other item storage or conveyor facility of loading of items onto the cart.

Embodiments of the connecting conveyor 125 are illustrated further in FIGS. 24-44. More specifically, FIGS. 24-34 show a first embodiment of the connecting conveyor 125 relying on partially overlapping belts, and FIGS. 35-44 show a second embodiment of the connecting conveyor 125 relying on a plurality of rollers mounted on a scissors extender.

Figure 27:
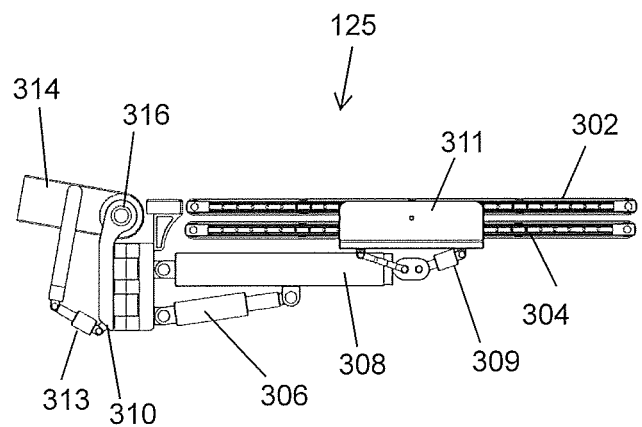
Figure 28:
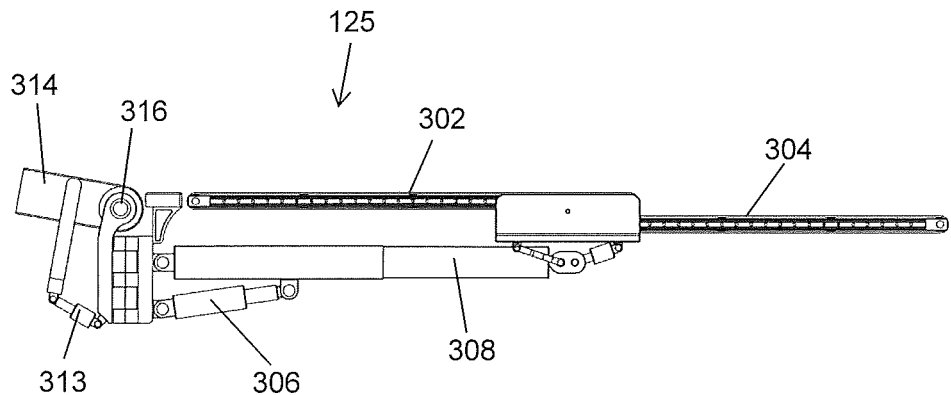
Figure 29:
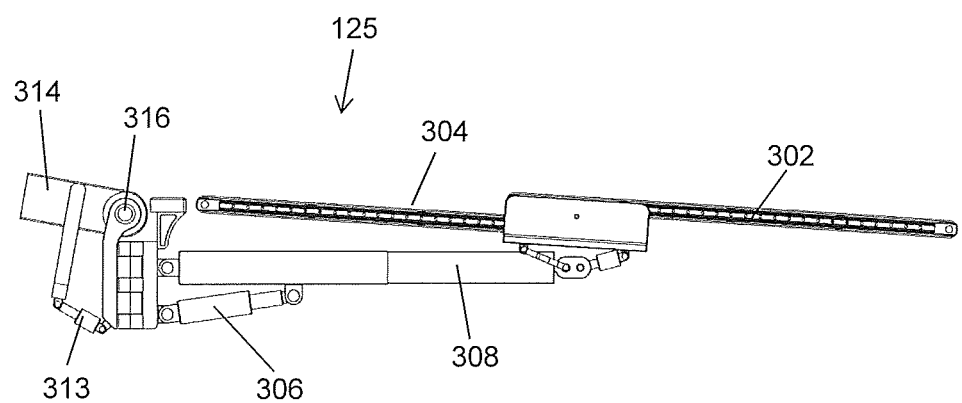
Figure 30:
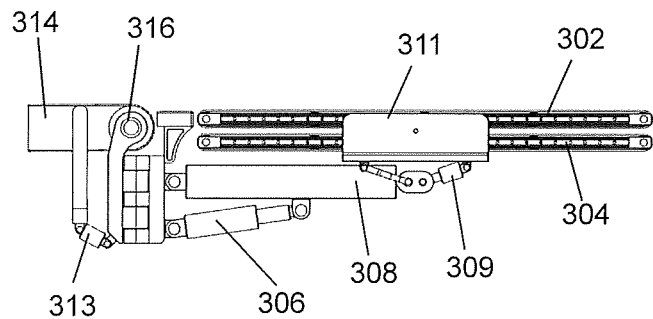
Figure 31:
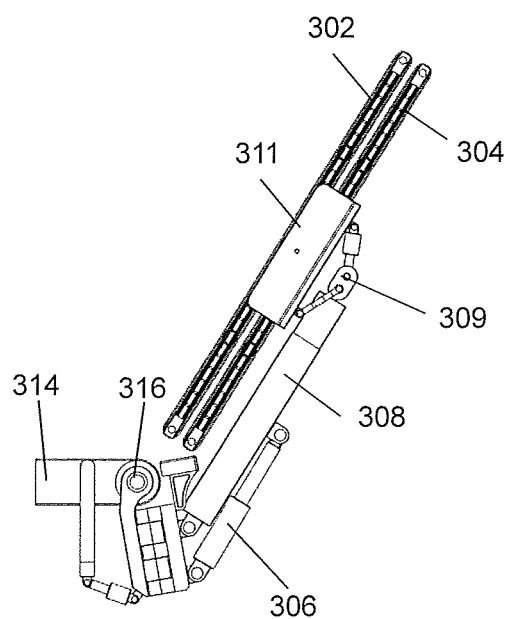
Figure 32:
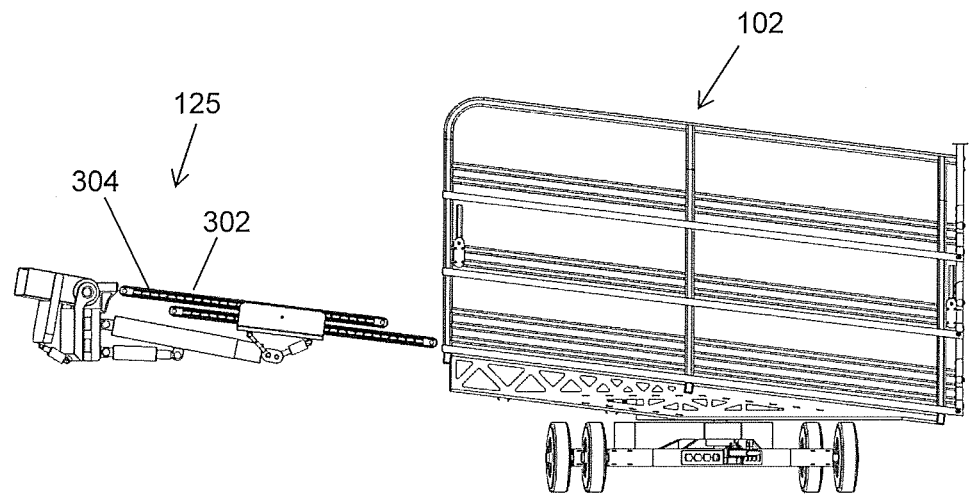
Figure 33:
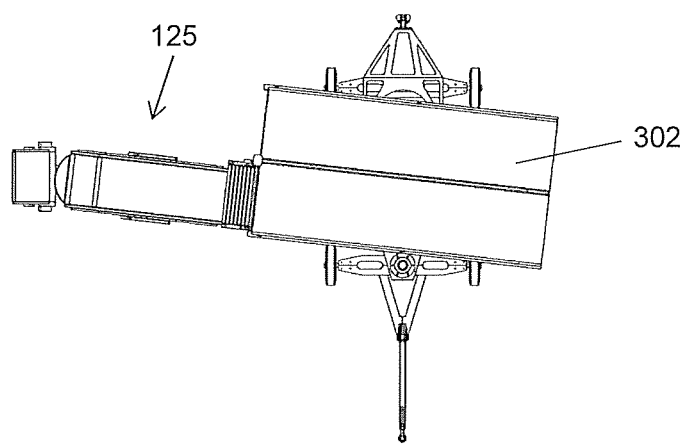
Figure 34:
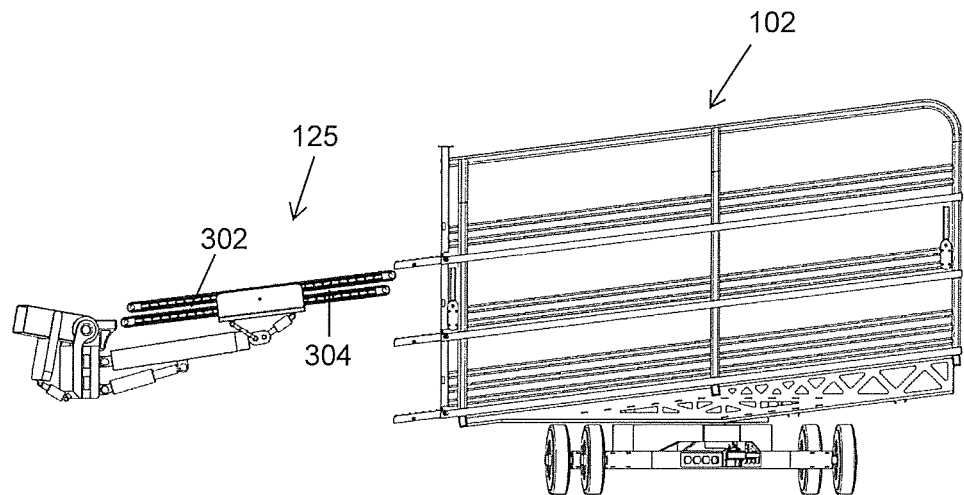

The embodiment of the connecting conveyor 125 shown in FIGS. 24-34 comprises two mutually displaceable conveyor elements 302 and 304, including for example motor driven belts. Mutual displacement of the conveyor elements 302 and 304 is achieved by actuators 306 and 308, which may include linear actuators, such as hydraulically driven cylinders or electrically driven actuators. In one embodiment, a first end of actuator 306 is pivotally attached to a support arm 310, and a second end of actuator 308 is attached to actuator 308. A first end of actuator 308 is pivotally attached to the support arm 310, and a second end of actuator 308 attaches to the conveyor elements 203 and 304 via link and actuator structure 309 and mounting element 311. At pivotal point of attachment 316, the support arm 310 attaches to a carrier structure 314, the support arm 310 being further connected to the carrier structure 314 at a downward extension thereof via linear actuator 313, which may include a hydraulically driven cylinder or electrically driven actuators. As shown in FIGS. 24-34, activation of the actuators and links 306, 308, 309 and 313 may cause the conveyor elements 302 and 304 to mutually displace in a linear direction in order to extract one of them relative to the other. Further, activation of the actuators and links 306, 308, 309 and 313 may cause the conveyor elements 302 and 304 to pivot relative to the carrier structure 314 around pivotal point of attachment 316. In FIGS. 24-26 and 28, the conveyor elements 302 are in a configuration for loading items onto the cart 102 by movement of the items from the left to the right in the drawings. For unloading of items from the cart 102 onto the connecting conveyor 125, i.e. for movement of items from the right to the left in the drawings, the conveyor elements 302 and 304 are brought into the configuration shown in FIGS. 29, and 32-34. In FIGS. 27, 30 and 31, the conveyor elements are in a parked position.

Figure 35:
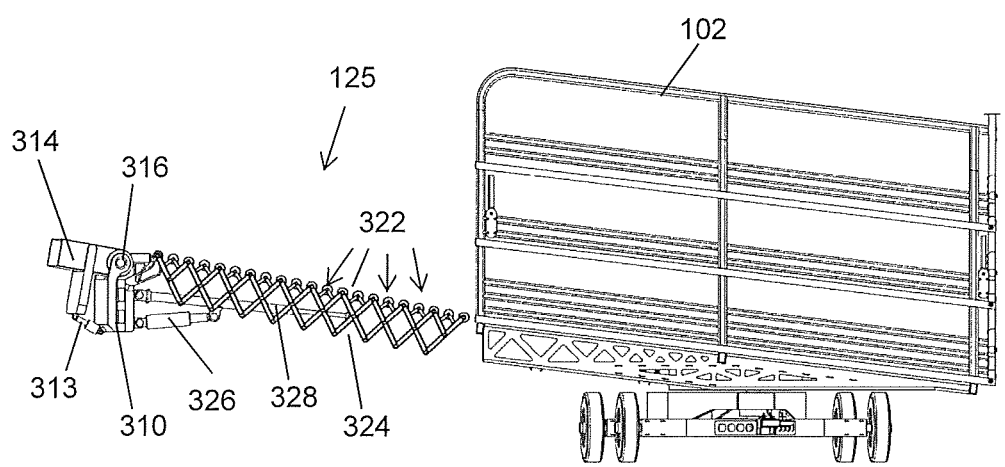
FIGS. 35-44 illustrate a second embodiment of a connecting conveyor—i.e. a so-called ramp connector—for use in a system according to the present invention.
Figure 36:
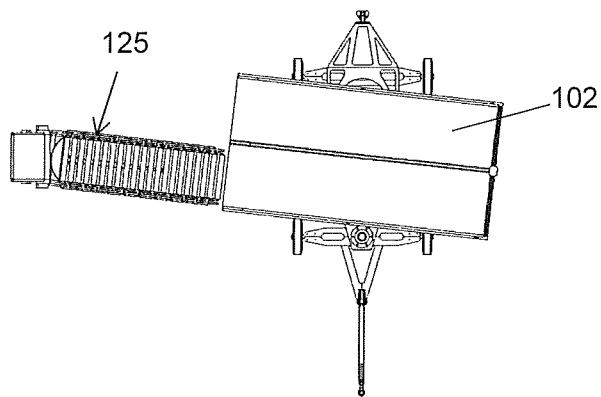
Figure 37:
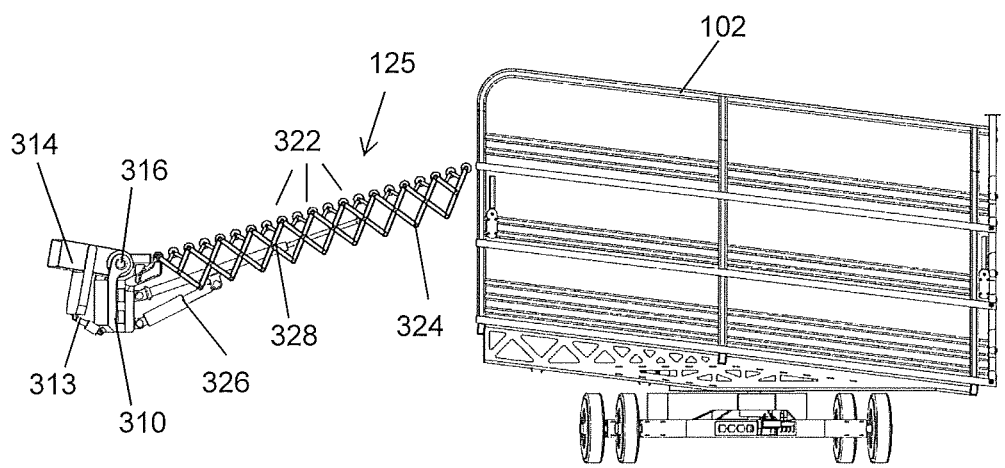
Figure 38:
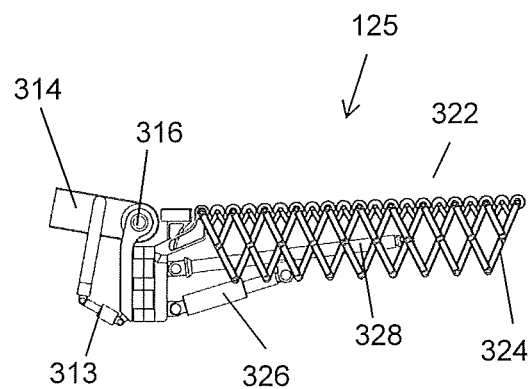
Figure 39:
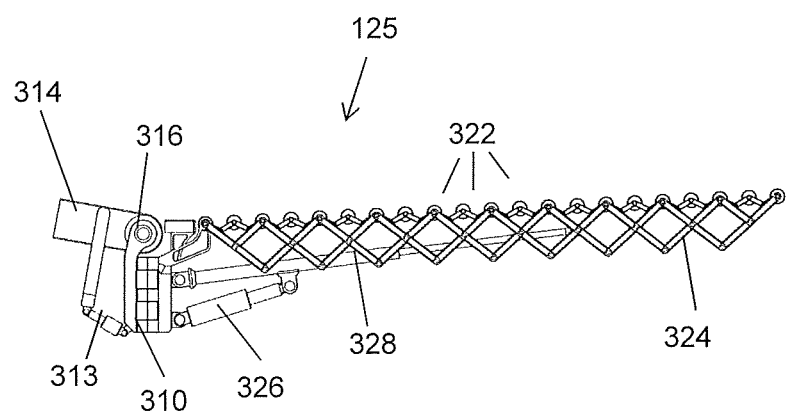
Figure 40:
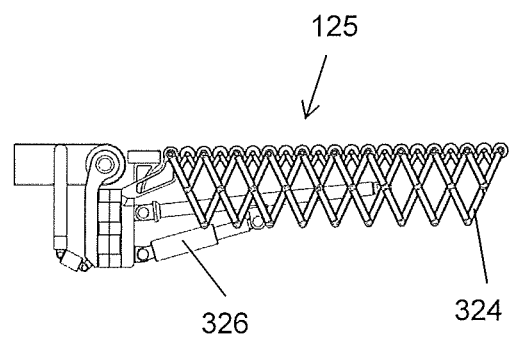
Figure 41:
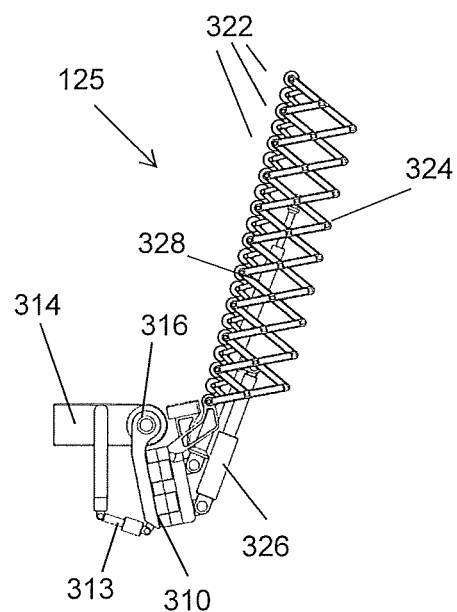
Figure 42:
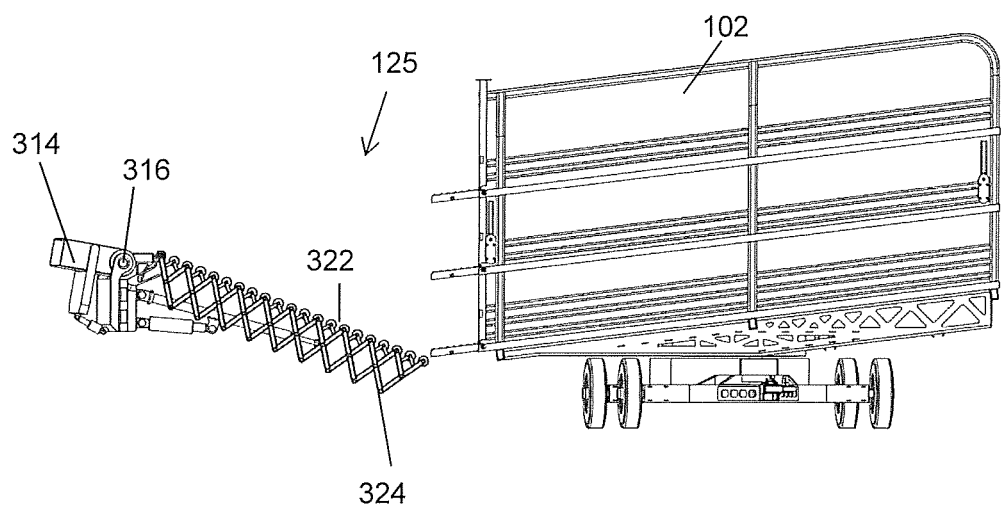
Figure 43:
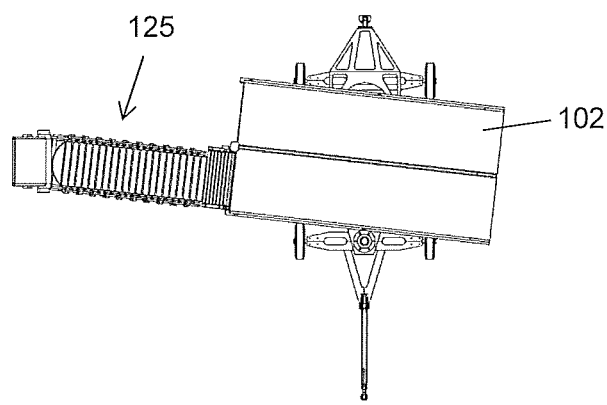
Figure 44:
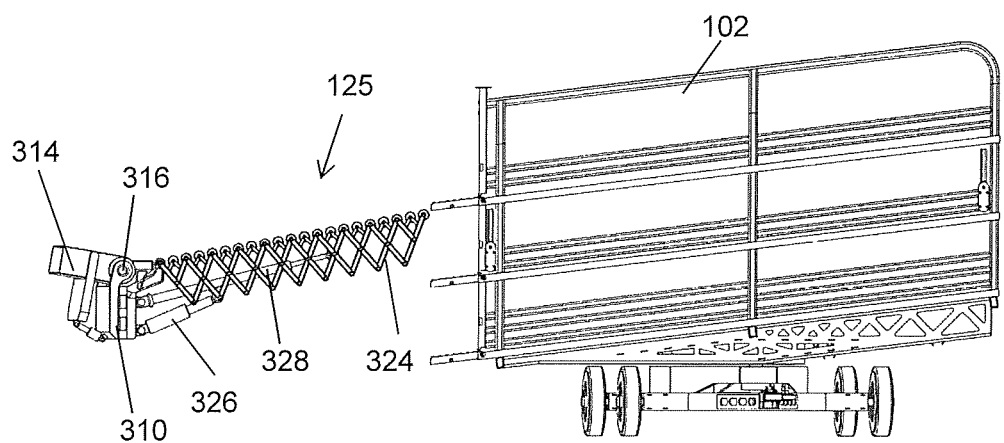

In an alternative embodiment of the connecting conveyor 125 shown in FIGS. 35-44, a plurality of rolling elements 322, which may be motor-driven or freely rotatable, are mounted on a scissors extender 324, which is pivotally supported at 316 relative to carrier structure 314 and extractable by activation of linear actuators 326 and 328 mounted on arm 310 and connected to the carrier structure 314 via actuator 313. Activation of the actuators 326, 328 and 313 may cause the scissors extender to extend or retract as desired and to pivot around point of attachment 316. FIGS. 35-37 show a loading configuration for conveying items onto the cart 102 from left to right in the drawings, and FIGS. 42-44 show an unloading configuration for conveying items away from the cart from right to left in the drawings. Various configurations for loading, unloading and parking are shown in FIGS. 38-41.

Figures 45, 46:
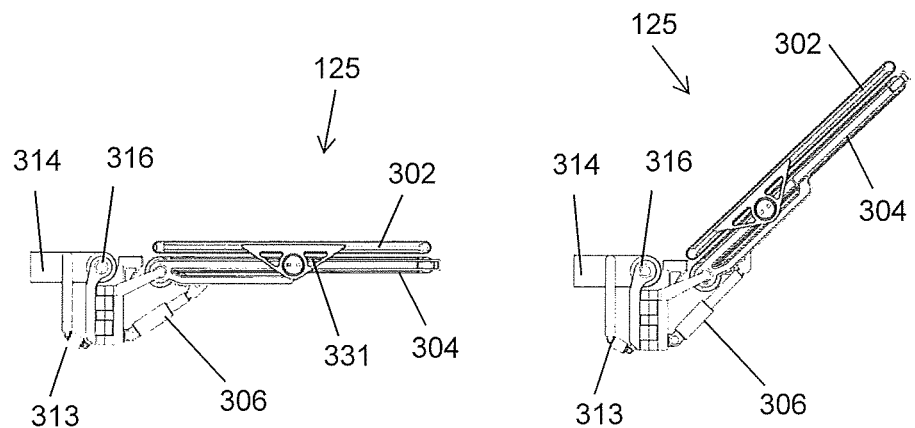
FIGS. 45-49 illustrate a third embodiment of a connecting conveyor—i.e. a so-called ramp connector—for use in a system according to the present invention.
Figure 47:
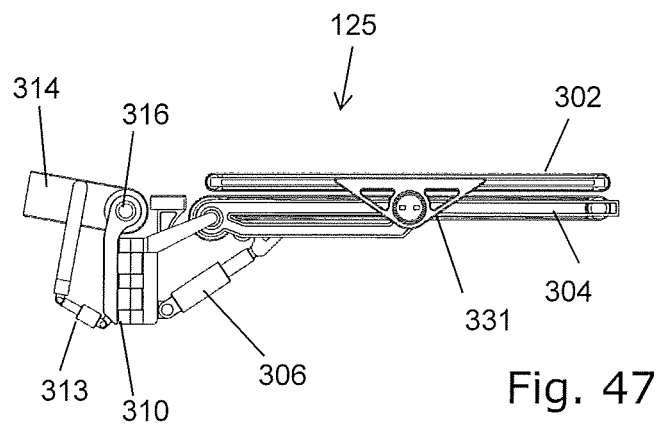
Figure 48:
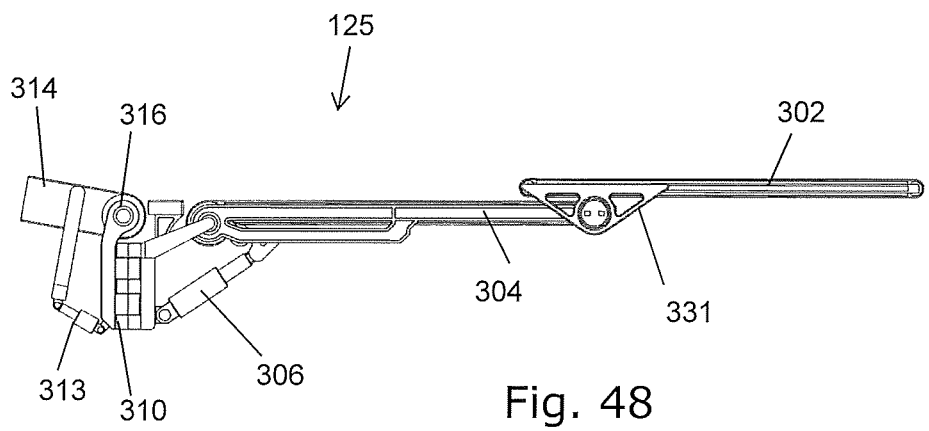
Figure 49:
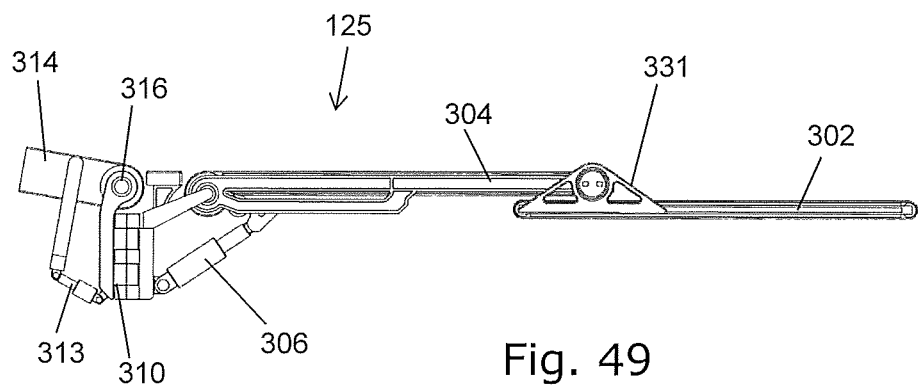

FIGS. 45-49 show a further embodiment of the connecting conveyor 125 similar to the embodiment of FIGS. 24-34. In the embodiment of FIGS. 45-49, the conveyor elements 302 and 304 are interconnected by means of a hinge element 331 which is pivotable by 180° around a horizontal axis. In a first operating configuration shown in FIG. 48, the hinge element 331 is in a first position, in which conveyor element 302 is elevated relative to conveyor element 304. In a second operating configuration shown in FIG. 49, the hinge element 331 is in a second position, in which conveyor element 304 is elevated relative to conveyor element 302. Preferably, the conveyor element 304 is fixed, whereby the hinge 331 with conveyor element 302 attached thereto may move relative to the conveyor element 304 between the two positions shown in FIGS. 48 and 49. One or the other 'waterfall' transition thus provided between the two conveyor elements 302 and 304 may be selectively chosen for loading and unloading of items, respectively, depending on the conveying direction of the items. In the configuration of FIG. 48, the conveyor direction is preferably from right to left, whereas the conveying direction is preferably from left to right in the configuration of FIG. 49. The conveyor element 302 may further be longitudinally slidable relative to the hinge element 331 in order to put the entire structure into a collapsed configuration, as shown in FIG. 47. FIGS. 45 and 46 show the connecting conveyor in recommended parking and towing configurations, respectively.

The invention claimed is:

1. A system for handling of luggage or parcel items, the system comprising:
at least one cart comprising a plurality of cart shelves, each of which is sized to accommodate a plurality of said items;
at least one item conveyor selected among:
a sorting or transfer conveyor for conveying the items from a sorting conveyor loading position to at least one unloading position; and
a delivery conveyor for conveying the items from a delivery conveyor loading position to a luggage reclaim area, or to the sorting conveyor, or to a parcel distribution facility, or to a further conveyor;

wherein:
at least one item accumulation unit arranged in proximity to at least one of:
said at least one unloading position of the sorting conveyor, and
the delivery conveyor loading position;
said item accumulation unit is configured to store a plurality of the items on a plurality of accumulation shelves;
an item transfer structure is configured to transfer said plurality of the items from the sorting conveyor or from the shelves of the at least one cart into the item accumulation unit;
an electronic control system controls operation of at least one of the item accumulation unit and the item transfer structure; and
wherein the delivery conveyor connects to a luggage reclaim belt for transfer of the items from the delivery conveyor loading position onto the luggage reclaim belt.

2. The system according to claim 1, wherein the control system is configured to assign, to each of the items, a particular branch of the delivery conveyor, before the items are being offloaded from the at least one cart.

3. The system according to claim 1, wherein the accumulation shelves of the item accumulation unit are configured to form a structure of first columns and/or rows.

4. The system according to claim 1, wherein the cart shelves of the at least one cart are configured to form a second structure of columns and/or rows, and wherein each respective accumulation and cart shelf of one of the first and second structures essentially lies flush with the other one of the first and second structures when the at least one cart is in a predetermined parking position relative to the item accumulation unit.

5. A system for handling of luggage or parcel items, the system comprising:
at least one cart comprising a plurality of cart shelves, each of which is sized to accommodate a plurality of said items;
at least one item conveyor selected among:
a sorting or transfer conveyor for conveying the items from a sorting conveyor loading position to at least one unloading position; and
a delivery conveyor for conveying the items from a delivery conveyor loading position to a luggage reclaim area, or to the sorting conveyor, or to a parcel distribution facility, or to a further conveyor;
wherein:
at least one item accumulation unit arranged in proximity to at least one of:
said at least one unloading position of the sorting conveyor, and
the delivery conveyor loading position;
said item accumulation unit is configured to store a plurality of the items on a plurality of accumulation shelves;
an item transfer structure is configured to transfer said plurality of the items from the sorting conveyor or from the shelves of the at least one cart into the item accumulation unit;
an electronic control system controls operation of at least one of the item accumulation unit and the item transfer structure;
the delivery conveyor connects to the sorting conveyor for transfer of the items from the delivery conveyor loading position onto the sorting conveyor; and
wherein the control system is configured to assign, to each of the items, a particular branch of the delivery conveyor, before the items are being offloaded from the at least one cart.

6. The system according to claim 5, wherein:
the item conveyor comprises at least said sorting conveyor;
the departure accumulation unit comprises at least one column of said plurality of accumulation shelves, which are arranged one above the other;
the item transfer structure is configured to selectively discharge each one of the plurality of items from the sorting conveyor into a selected one of said accumulation shelves in said column;
and wherein the control system is configured to select one of said accumulation shelves for each item and to control the item transfer structure to the selected accumulation shelf.

7. The system according to claim 6, wherein the control system is configured to assign, to each of the items, a particular accumulation shelf of the departure accumulation unit, before the items are being loaded into the departure accumulation unit from the sorting conveyor.

8. The system according to claim 5, wherein the item accumulation unit comprises an item movement structure for automatically moving each one of the items accommodated by each one of the accumulation shelves from a loading end thereof towards an unloading end thereof.

9. The system according to claim 5, wherein the accumulation shelves of the item accumulation unit are configured to form a structure of first columns and/or rows.

10. The system according to claim 5, wherein the cart shelves of the at least one cart are configured to form a second structure of columns and/or rows, and wherein each respective accumulation and cart shelf of one of the first and second structures essentially lies flush with the other one of the first and second structures when the at least one cart is in a predetermined parking position relative to the item accumulation unit.

11. A system for handling of luggage or parcel items, the system comprising:
at least one cart comprising a plurality of cart shelves, each of which is sized to accommodate a plurality of said items;
at least one item conveyor selected among:
a sorting or transfer conveyor for conveying the items from a sorting conveyor loading position to at least one unloading position; and
a delivery conveyor for conveying the items from a delivery conveyor loading position to a luggage reclaim area, or to the sorting conveyor, or to a parcel distribution facility, or to a further conveyor;
wherein:
at least one item accumulation unit arranged in proximity to at least one of:
said at least one unloading position of the sorting conveyor, and
the delivery conveyor loading position;
said item accumulation unit is configured to store a plurality of the items on a plurality of accumulation shelves;
an item transfer structure is configured to transfer said plurality of the items from the sorting conveyor or from the shelves of the at least one cart into the item accumulation unit;
an electronic control system controls operation of at least one of the item accumulation unit and the item transfer structure;

each of the shelves of the item accumulation unit comprises an accumulation conveyor belt, and wherein the control system is configured to control operation of the accumulation conveyor belt; and wherein the accumulation shelves of the item accumulation unit are arranged in rows one above the other, and wherein the accumulation unit is configured to feed the items from a lower one of the rows directly onto the delivery conveyor, and wherein the accumulation unit further comprises a discharge chute at an unloading end of upper ones of the shelves for dropping the items onto the delivery conveyor under the action of gravity.

12. The system according to claim 11, wherein:

the item conveyor comprises at least said sorting conveyor;

the departure accumulation unit comprises at least one column of said plurality of accumulation shelves, which are arranged one above the other;

the item transfer structure is configured to selectively discharge each one of the plurality of items from the sorting conveyor into a selected one of said accumulation shelves in said column;

the control system is configured to select one of said accumulation shelves for each item and to control the item transfer structure to the selected accumulation shelf; and the control system is configured to assign, to each of the items, a particular accumulation shelf of the departure accumulation unit, before the items are being loaded into the departure accumulation unit from the sorting conveyor.

13. The system according to claim 11, wherein the delivery conveyor connects to the sorting conveyor for transfer of the items from the delivery conveyor loading position onto the sorting conveyor.

14. The system according to claim 11, wherein the cart shelves of the at least one cart are configured to form a second structure of columns and/or rows, and wherein each respective accumulation and cart shelf of one of the first and second structures essentially lies flush with the other one of the first and second structures when the at least one cart is in a predetermined parking position relative to the item accumulation unit.

15. A system for handling of luggage or parcel items, the system comprising:

at least one cart comprising a plurality of cart shelves, each of which is sized to accommodate a plurality of said items;

at least one item conveyor selected among:
  a sorting or transfer conveyor for conveying the items from a sorting conveyor loading position to at least one unloading position; and
  a delivery conveyor for conveying the items from a delivery conveyor loading position to a luggage reclaim area, or to the sorting conveyor, or to a parcel distribution facility, or to a further conveyor;

wherein:
  at least one item accumulation unit arranged in proximity to at least one of:
    said at least one unloading position of the sorting conveyor, and
    the delivery conveyor loading position;
  said item accumulation unit is configured to store a plurality of the items on a plurality of accumulation shelves;
  an item transfer structure is configured to transfer said plurality of the items from the sorting conveyor or from the shelves of the at least one cart into the item accumulation unit;
  an electronic control system controls operation of at least one of the item accumulation unit and the item transfer structure; and
  wherein the delivery conveyor comprises a vertically displaceable or a variably inclinable conveyor section.

16. The system according to claim 15, wherein:

the item conveyor comprises at least said sorting conveyor;

the departure accumulation unit comprises at least one column of said plurality of accumulation shelves, which are arranged one above the other;

the item transfer structure is configured to selectively discharge each one of the plurality of items from the sorting conveyor into a selected one of said accumulation shelves in said column; and wherein the control system is configured to select one of said accumulation shelves for each item and to control the item transfer structure to the selected accumulation shelf.

17. The system according to claim 16, wherein the control system is configured to assign, to each of the items, a particular accumulation shelf of the departure accumulation unit, before the items are being loaded into the departure accumulation unit from the sorting conveyor.

18. The system according to claim 15, wherein the item accumulation unit comprises an item movement structure for automatically moving each one of the items accommodated by each one of the accumulation shelves from a loading end thereof towards an unloading end thereof.

19. The system according to claim 15, wherein the accumulation shelves of the item accumulation unit are configured to form a structure of first columns and/or rows.

20. The system according to claim 15, wherein the cart shelves of the at least one cart are configured to form a second structure of columns and/or rows, and wherein each respective accumulation and cart shelf of one of the first and second structures essentially lies flush with the other one of the first and second structures when the at least one cart is in a predetermined parking position relative to the item accumulation unit.

* * * * *